United States Patent
Dai et al.

(10) Patent No.: US 12,434,583 B2
(45) Date of Patent: Oct. 7, 2025

(54) BIDIRECTIONAL ENERGY TRANSMISSION APPARATUS, ON-BOARD CHARGER, AND ELECTRIC VEHICLE

(71) Applicant: HUAWEI DIGITAL POWER TECHNOLOGIES CO., LTD., Shenzhen (CN)

(72) Inventors: Shengyong Dai, Dongguan (CN); Grover Victor Torrico-Bascopé, Kista (SE)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 467 days.

(21) Appl. No.: 17/955,427

(22) Filed: Sep. 28, 2022

(65) Prior Publication Data

US 2023/0020030 A1    Jan. 19, 2023

Related U.S. Application Data

(63) Continuation of application No. PCT/CN2020/085934, filed on Apr. 21, 2020.

(30) Foreign Application Priority Data

Mar. 31, 2020    (WO) ................ PCT/CN2020/082626

(51) Int. Cl.
*B60L 53/22*    (2019.01)
*H02J 7/04*    (2006.01)
(Continued)

(52) U.S. Cl.
CPC ............... *B60L 53/22* (2019.02); *H02J 7/04* (2013.01); *H02M 1/42* (2013.01);
(Continued)

(58) Field of Classification Search
CPC ...... B60L 53/22; B60L 2210/10; B60L 53/11; B60L 53/57; H02J 7/04; H02J 2207/20;
(Continued)

(56) References Cited

U.S. PATENT DOCUMENTS

| 10,562,404 B1 | 2/2020 | Khaligh et al. |
| 2004/0062059 A1* | 4/2004 | Cheng ...................... H02J 5/00 363/17 |

(Continued)

FOREIGN PATENT DOCUMENTS

| CN | 205986277 U | 2/2017 |
| CN | 107947309 A | 4/2018 |

(Continued)

OTHER PUBLICATIONS

International Search Report and Written Opinion in International Appln. No. PCT/CN2020/085934, mailed on Dec. 31, 2020, 20 pages (with English translation).

*Primary Examiner* — Paul Dinh
(74) *Attorney, Agent, or Firm* — Fish & Richardson P.C.

(57) ABSTRACT

Example bidirectional energy transmission apparatus and methods are described. An example of a bidirectional energy transmission apparatus includes a controller and a bidirectional energy transmission circuit. A control terminal of the controller is connected to a controlled terminal of the bidirectional energy transmission circuit. In the example, the controller is configured to control the bidirectional energy transmission circuit to be in a rectification working state, so as to convert, into a first direct current voltage, a three-phase or single-phase alternating current voltage that is input from a first port of the bidirectional energy transmission circuit, and output the first direct current voltage from a second port of the bidirectional energy transmission circuit. The controller is configured to control the bidirectional energy
(Continued)

transmission circuit to be in an inversion working state, so as to convert, into a three-phase or single-phase alternating current voltage.

20 Claims, 12 Drawing Sheets

(51) Int. Cl.
  *H02M 1/42* (2007.01)
  *H02M 3/335* (2006.01)
  *H02M 7/797* (2006.01)
(52) U.S. Cl.
  CPC ....... *H02M 3/33584* (2013.01); *H02M 7/797* (2013.01); *B60L 2210/10* (2013.01); *H02J 2207/20* (2020.01)
(58) Field of Classification Search
  CPC .......... H02J 2310/48; H02J 7/02; H02M 1/42; H02M 3/33584; H02M 7/797; Y02T 10/70; Y02T 10/7072; Y02T 10/72; Y02T 90/14

USPC ........................................................ 320/109
  See application file for complete search history.

(56) References Cited

U.S. PATENT DOCUMENTS

| | | | | |
|---|---|---|---|---|
| 2007/0012492 | A1* | 1/2007 | Deng | ...................... B60L 50/13 |
| | | | | 180/65.1 |
| 2016/0181798 | A1* | 6/2016 | Izadian | ................. H02M 7/797 |
| | | | | 363/78 |
| 2018/0343727 | A1 | 11/2018 | Ishiyama | |

FOREIGN PATENT DOCUMENTS

| | | |
|---|---|---|
| CN | 109861357 A | 6/2019 |
| CN | 109889077 A | 6/2019 |
| CN | 110350796 A | 10/2019 |
| CN | 110356268 A | 10/2019 |
| CN | 110518680 A | 11/2019 |

* cited by examiner

BIDIRECTIONAL ENERGY TRANSMISSION APPARATUS, ON-BOARD CHARGER, AND ELECTRIC VEHICLE

CROSS-REFERENCE TO RELATED APPLICATIONS

This application is a continuation of International Application No. PCT/CN2020/085934, filed on Apr. 21, 2020, which claims priority to International Patent Application No. PCT/CN2020/082626, filed on Mar. 31, 2020. The disclosures of the aforementioned applications are hereby incorporated by reference in their entireties.

TECHNICAL FIELD

This application relates to the field of on-board charging, and in particular, to a bidirectional energy transmission apparatus, an on-board charger, and an electric vehicle.

BACKGROUND

With the development of electric vehicles, an on-board charger (on-board charger, OBC) is widely used. In addition, it is found that battery capacities of the electric vehicles become higher, and charging time increases. The OBC with a three-phase AC input can increase charging power to shorten the charging time. In addition, to improve user experience, an inverter circuit has been used as a standard function. Applications of vehicle-to-vehicle (vehicle-to-vehicle, V2V), vehicle-to-load (vehicle-to-load, V2L), and vehicle-to-grid (vehicle-to-grid, V2G) may be implemented by using an inverter technology. How to implement both high-power charging and an inverter function by using a proper design is a problem that needs to be resolved urgently.

For the foregoing problem, the conventional technology provides a circuit shown in FIG. 1. A working principle of the circuit is as follows: Three independent converters are used, where each independent converter includes a power factor correction (power factor correction, PFC) circuit and a direct current-direct current (direct current-direct current, DC-DC) circuit, and three independent converter output ports (that is, an output port $V_{o1}$ of a DC-DC circuit 1, an output port $V_{o2}$ of a DC-DC circuit 2, and an output port $V_{o3}$ of a DC-DC circuit 3) are connected in parallel. The converter 1 including a PFC circuit 1 and the DC-DC circuit 1 has a hardware topology architecture as the converter 2 including a PFC circuit 2 and the DC-DC circuit 2. The converter 1 is a bridged PFC+LLC resonant circuit combination, and an output side is a full-bridge diode rectifier. The converter 3 including a PFC circuit 3 and the DC-DC circuit 3 is a bridgeless PFC+LLC combination, and an output side is a full-bridge MOS transistor combination. In this way, the converter 3 may further implement an inverter function.

However, the circuit shown in FIG. 1 has the following disadvantages of a complex circuit, too many power components used, high costs, and an unstable system. In addition, only single-phase inversion can be implemented during inversion, and inverter output power is low.

SUMMARY

Embodiments of this application provide a bidirectional energy transmission apparatus, an on-board charger, and an electric vehicle. By using the embodiments of this application, both a high-power charging function and an inverter function may be implemented.

According to a first aspect, an embodiment of this application provides a bidirectional energy transmission apparatus, including a controller and a bidirectional energy transmission circuit. A control terminal of the controller is connected to a controlled terminal of the bidirectional energy transmission circuit.

The controller is configured to control the bidirectional energy transmission circuit to be in a rectification working state, so as to convert, into a first direct current voltage, a three-phase or single-phase alternating current voltage that is input from a first port of the bidirectional energy transmission circuit, and output the first direct current voltage from a second port of the bidirectional energy transmission circuit. Alternatively, the controller is configured to control the bidirectional energy transmission circuit to be in an inversion working state, so as to convert, into a three-phase or single-phase alternating current voltage, a first direct current voltage that is input from a second port of the bidirectional energy transmission circuit, and output the three-phase or single-phase alternating current voltage from a first port of the bidirectional energy transmission circuit.

The controller controls the bidirectional energy transmission circuit to be in different working states, so as to implement bidirectional conversion from the three-phase/single-phase alternating current voltage to the direct current voltage, so that configuration is flexible. In this way, both a high-power charging function and an inverter function may be implemented.

In a feasible embodiment, the rectification working state includes a first rectification working state and a second rectification working state. The controller controlling the bidirectional energy transmission circuit to be in the rectification working state specifically includes:

When it is detected that the three-phase alternating current voltage is input from the first port of the bidirectional energy transmission circuit, the controller controls the bidirectional energy transmission circuit to be in the first rectification working state, so as to convert the three-phase alternating current voltage into the first direct current voltage, and output the first direct current voltage from the second port of the bidirectional energy transmission circuit.

When it is detected that the single-phase alternating current voltage is input from the first port of the bidirectional energy transmission circuit, the controller controls the bidirectional energy transmission circuit to be in the first rectification working state, so as to convert the three-phase alternating current voltage into the first direct current voltage, and output the first direct current voltage from the second port of the bidirectional energy transmission circuit.

In a feasible embodiment, the inversion working state includes a first inversion working state and a second inversion working state. The controller controlling the bidirectional energy transmission circuit to be in the inversion working state specifically includes:

When it is detected that the three-phase alternating current voltage is output from the first port of the bidirectional energy transmission circuit, the controller controls the bidirectional energy transmission circuit to be in the first inversion working state, so as to convert, into the three-phase alternating current voltage, the first direct current voltage that is input from the second port of the bidirectional energy transmission circuit, and output the three-phase alternating current voltage from the first port of the bidirectional energy transmission circuit.

When it is detected that the single-phase alternating current voltage is output from the first port of the bidirectional energy transmission circuit, the controller controls the bidirectional energy transmission circuit to be in the second inversion working state, so as to convert, into the single-phase alternating current voltage, the first direct current voltage that is input from the second port of the bidirectional energy transmission circuit, and output the single-phase alternating current voltage from the first port of the bidirectional energy transmission circuit.

It should be noted herein that, whether the three-phase alternating current voltage or the single-phase alternating current voltage is input or output from the first port of the bidirectional energy transmission circuit may be detected by detecting a type of a connector connected to the first port of the bidirectional energy transmission circuit. When the connector is a four-hole connector, it is determined that the three-phase alternating current voltage is input or output from the first port of the bidirectional energy transmission circuit. When the connector is a two-hole connector, it is determined that the single-phase alternating current voltage is input or output from the first port of the bidirectional energy transmission circuit.

Specifically, the bidirectional energy transmission circuit includes a bidirectional conversion circuit and a direct current to direct current (direct current to direct current DC-DC) circuit. A second port of the bidirectional conversion circuit is connected to a first port of the DC-DC circuit. The controlled terminal of the bidirectional transmission circuit includes a controlled terminal of the bidirectional conversion circuit and a controlled terminal of the DC-DC circuit. The controller controlling the bidirectional energy transmission circuit to be in a first rectification state specifically includes:

The controller controls the bidirectional conversion circuit to be in a first working state, so as to convert, into a second direct current voltage, a three-phase alternating current voltage that is input from a first port of the bidirectional conversion circuit, and output the second direct current voltage from the second port of the bidirectional conversion circuit; and controls the DC-DC circuit to be in a second working state, so as to convert, into a first direct current voltage, a second direct current voltage that is input from the first port of the DC-DC circuit, and output the first direct current voltage from a second port of the DC-DC circuit.

The controller controlling the bidirectional energy transmission circuit to be in a second rectification state specifically includes:

The controller controls the bidirectional conversion circuit to be in a third working state, so as to convert, into a second direct current voltage, a single-phase alternating current voltage that is input from a first port of the bidirectional conversion circuit, and output the second direct current voltage from the second port of the bidirectional conversion circuit; and controls the DC-DC circuit to be in a second working state, so as to convert, into a first direct current voltage, a second direct current voltage that is input from the first port of the DC-DC circuit, and output the first direct current voltage from a second port of the DC-DC circuit. The first direct current voltage is the same as or different from the second direct current voltage.

Specifically, the controller controlling the bidirectional energy transmission circuit to be in a first inversion state specifically includes:

The controller controls the DC-DC circuit to be in a fourth working state, so as to convert, into a second direct current voltage, a first voltage that is input from the second port of the DC-DC circuit, and output the second direct current voltage from the first port of the DC-DC circuit; and controls the bidirectional conversion circuit to be in a fifth working state, so as to convert, into a three-phase alternating current voltage, a second direct current voltage that is input from the second port of the bidirectional conversion circuit, and output the three-phase alternating current voltage from the first port of the bidirectional conversion circuit.

The controller controlling the bidirectional energy transmission circuit to be in a second inversion state specifically includes:

The controller controls the DC-DC circuit to be in a fourth working state, so as to convert, into a second direct current voltage, a first voltage that is input from the second port of the DC-DC circuit, and output the second direct current voltage from the first port of the DC-DC circuit; and controls the bidirectional conversion circuit to be in a sixth working state, so as to convert, into a single-phase alternating current voltage, a second direct current voltage that is input from the second port of the bidirectional conversion circuit, and output the single-phase alternating current voltage from the first port of the bidirectional conversion circuit.

In a feasible embodiment, the bidirectional conversion circuit includes an energy storage/filter circuit, a switching network, and an energy storage circuit. A first port of the energy storage/filter circuit is the first port of the bidirectional conversion circuit. A second port of the energy storage/filter circuit is connected to a first port of the switching network. A third port of the energy storage/filter circuit is connected to a first port of the energy storage circuit. A second port of the switching network is connected to the first port of the energy storage circuit. A second port of the energy storage circuit is the second port of the bidirectional conversion circuit. The controlled terminal of the bidirectional conversion circuit includes a controlled terminal of the energy storage/filter circuit and a controlled terminal of the switching network.

The DC-DC circuit includes a first bridge, a second bridge, a third bridge, a fourth bridge, a first resonant network, a second resonant network, and an energy storage device.

The first port of the DC-DC circuit includes a first port of the first bridge and a first port of the third bridge. A second port of the first bridge is connected to a first port of the first resonant network. A second port of the first resonant network is connected to a first port of the second bridge. A second port of the third bridge is connected to a first port of the second resonant network. A second port of the second resonant network is connected to a second port of the fourth bridge. A second port of the second bridge and a second port of the fourth bridge are both connected to a first port of the energy storage device. The second port of the DC-DC circuit is a second port of the energy storage device. The controlled terminal of the DC-DC circuit includes a controlled terminal of the first bridge, a controlled terminal of the second bridge, a controlled terminal of the third bridge, and a controlled terminal of the fourth bridge.

In a feasible embodiment, the controller controlling the bidirectional conversion circuit to be in the first working state specifically includes:

The controller controls the energy storage/filter circuit and the switching network to be in a first state st1, so as to implement:

The energy storage/filter circuit performs energy storage on a three-phase alternating current voltage that is input from the first port of the energy storage/filter circuit, and outputs a direct current voltage from the second port of the energy storage/filter circuit. The switching network performs power conversion on a direct current voltage that is input from the first port of the switching network, and outputs a converted direct current voltage from the second port of the switching network. The energy storage network performs energy storage on a direct current voltage that is input from the first port of the energy storage network, and outputs the second direct current voltage from the second port of the energy storage network.

In a feasible embodiment, the controller controlling the bidirectional conversion circuit to be in the third working state specifically includes:

The controller controls the energy storage/filter circuit and the switching network to be in a third state st3, so as to implement:

The energy storage/filter circuit performs energy storage on a single-phase alternating current voltage that is input from the first port of the energy storage/filter circuit, and outputs a direct current voltage from the second port of the energy storage/filter circuit. The switching network performs power conversion on a direct current voltage that is input from the first port of the switching network, and outputs a converted direct current voltage from the second port of the switching network. The energy storage network performs energy storage on a direct current voltage that is input from the first port of the energy storage network, and outputs the second direct current voltage from the second port of the energy storage network.

In a feasible embodiment, the controller controlling the bidirectional conversion circuit to be in the fifth working state specifically includes:

The controller controls the energy storage/filter circuit and the switching network to be in a fifth state st5, so as to implement:

The energy storage network performs energy storage on a direct current voltage that is input from the second port of the energy storage network, and outputs the direct current voltage from the first port of the energy storage network. The switching network performs power conversion on a direct current voltage that is input from the second port of the switching network, and outputs a converted direct current voltage from the first port of the switching network. The energy storage/filter circuit filters a direct current voltage that is input from the second port of the energy storage/filter circuit, and outputs a three-phase alternating current voltage from the first port of the energy storage/filter circuit.

In a feasible embodiment, the controller controlling the bidirectional conversion circuit to be in the sixth working state specifically includes:

The controller controls the energy storage/filter circuit and the switching network to be in a sixth state st6, so as to implement:

The energy storage network performs energy storage on a direct current voltage that is input from the second port of the energy storage network, and outputs the direct current voltage from the first port of the energy storage network. The switching network performs power conversion on a direct current voltage that is input from the second port of the switching network, and outputs a converted direct current voltage from the first port of the switching network. The energy storage/filter circuit filters a direct current voltage that is input from the second port of the energy storage/filter circuit, and outputs a single-phase alternating current voltage from the first port of the energy storage/filter circuit.

In a feasible embodiment, the controller controlling the DC-DC circuit to be in the second working state specifically includes:

The controller controls the first bridge, the second bridge, the third bridge, and the fourth bridge to be in a second state st2, so as to implement:

the first bridge is configured to perform power conversion on a direct current voltage that is input from the first port of the bridge, and output a converted direct current voltage from the second port of the bridge; the first resonant network is configured to perform power conversion on an input direct current voltage, and output a converted direct current voltage; and the second bridge is configured to rectify a direct current voltage that is input from the first port of the bridge, and output a rectified direct current voltage from the second port of the bridge; and/or the third bridge is configured to perform power conversion on a direct current voltage that is input from the first port of the bridge, and output a converted direct current voltage from the second port of the bridge; the second resonant network is configured to perform power conversion on an input direct current voltage, and output a converted direct current voltage; and the fourth bridge is configured to rectify a direct current voltage that is input from the first port of the bridge, and output a rectified direct current voltage from the second port of the bridge.

The second direct current voltage is the direct current voltage that is input from the first port of the first bridge, or the direct current voltage that is input from the first port of the third bridge, or a sum of the direct current voltage that is input from the first port of the first bridge and the direct current voltage that is input from the first port of the third bridge.

The first direct current voltage is the direct current voltage that is output from the second port of the second bridge, or the direct current voltage that is output from the second port of the fourth bridge, or a sum of the direct current voltage that is output from the second port of the second bridge and the direct current voltage that is output from the second port of the fourth bridge.

In a feasible embodiment, the controller controlling the DC-DC circuit to be in the fourth working state specifically includes:

The controller controls the first bridge, the second bridge, the third bridge, and the fourth bridge to be in a fourth state st4, so as to implement:

the second bridge is configured to perform power conversion on a direct current voltage that is input from the second port of the bridge, and output a converted direct current voltage from the first port of the bridge; the first resonant network is configured to perform power conversion on an input direct current voltage, and output a converted direct current voltage; and the first bridge is configured to rectify a direct current voltage that is input from the second port of the bridge, and output a rectified direct current voltage from the first port of the bridge; and/or the fourth bridge is configured to perform power conversion on a direct current voltage that is input from the second port of the bridge, and output a converted direct current voltage from the first port of the bridge; the second resonant network is configured to perform power conversion on an input direct current voltage, and output a converted direct current voltage; and the third bridge is configured to rectify a direct current voltage that is input from the second port of the bridge, and output a rectified direct current voltage from the first port of the bridge.

The second direct current voltage is the direct current voltage that is output from the first port of the first bridge, or the direct current voltage that is output from the first port of the third bridge, or a sum of the direct current voltage that is output from the first port of the first bridge and the direct current voltage that is output from the first port of the third bridge.

The first direct current voltage is the direct current voltage that is input from the second port of the second bridge, or the direct current voltage that is input from the second port of the fourth bridge, or a sum of the direct current voltage that is input from the second port of the second bridge and the direct current voltage that is input from the second port of the fourth bridge.

In a feasible embodiment, the first port of the bidirectional energy transmission circuit includes an A-phase port, a B-phase port, a C-phase port, and an N-phase port.

When the three-phase alternating current voltage is input or output from the first port of the bidirectional energy transmission circuit, the three-phase alternating current voltage is input or output from the A-phase port, the B-phase port, the C-phase port, and the N-phase port of the bidirectional energy transmission circuit. When the single-phase alternating current voltage is input or output from the first port of the bidirectional energy transmission circuit, the single-phase alternating current voltage is input or output from the A-phase port and the N-phase port of the bidirectional energy transmission circuit.

In a feasible embodiment, the energy storage/filter circuit includes a capacitor C1, a capacitor C2, a capacitor C3, an inductor L1, an inductor L2, an inductor L3, a switching transistor S1, and a switching transistor S2.

A first end part of the inductor L1 is connected to a first end part of the switching transistor S2 by using the capacitor C1. A first end part of the inductor L2 is connected to the first end part of the switching transistor S2 by using the capacitor C2 and the switching transistor S1 that are connected in parallel. The capacitor C2 and a first end part of the capacitor L3 are connected to the first end part of the switching transistor S2 by using the capacitor C3. The first end part of the inductor L1, the first end part of the inductor L2, and the first end part of the inductor L3 are respectively the A-phase port, the B-phase port, and the C-phase port. The first end part of the switching transistor S2 is the N-phase port. A second end part of the inductor L1, a second end part of the inductor L2, and a second end part of the inductor L3 form the second port of the energy storage/filter circuit. A second end part of the switching transistor S2 is the third port of the energy storage/filter circuit.

The controlled terminal of the energy storage/filter circuit includes a controlled terminal of the switching transistor S1 and a controlled terminal of the switching transistor S2.

In a feasible embodiment, the switching network includes a MOS transistor Q1, a MOS transistor Q2, a MOS transistor Q3, a MOS transistor Q4, a MOS transistor Q5, a MOS transistor Q6, a switching transistor S3, a switching transistor S4, and a switching transistor S5.

Both a drain of the MOS transistor Q1 and a drain of the MOS transistor Q3 are connected to a drain of the MOS transistor Q5. A source of the MOS transistor Q1 is connected to a drain of the MOS transistor Q2. A source of the MOS transistor Q2 is connected to a drain of the MOS transistor Q4. A source of the MOS transistor Q5 is connected to a drain of the MOS transistor Q6. Both the source of the MOS transistor Q2 and a source of the MOS transistor Q4 are connected to a source of the MOS transistor Q6. A first end part of the switching transistor S3 is connected between the source of the MOS transistor Q1 and the drain of the MOS transistor Q2. A first end part of the switching transistor S4 is connected between a source of the MOS transistor Q3 and the drain of the MOS transistor Q4. A first end part of the switching transistor S5 is connected between the source of the MOS transistor Q5 and the drain of the MOS transistor Q6. The source of the MOS transistor Q1, the source of the MOS transistor Q3, and the source of the MOS transistor Q5 form the first port of the switching network. The drain of the MOS transistor Q5, the source of the MOS transistor Q6, a second end part of the switching transistor S3, a second end part of the switching transistor S4, and a second end part of the switching transistor S5 form the second port of the switching network.

The controlled terminal of the switching network includes a gate of the MOS transistor Q1, a gate of the MOS transistor Q2, a gate of the MOS transistor Q3, a gate of the MOS transistor Q4, a gate of the MOS transistor Q5, a gate of the MOS transistor Q6, a controlled terminal of the switching transistor S3, a controlled terminal of the switching transistor S4, and a controlled terminal of the switching transistor S5.

In a feasible embodiment, the energy storage circuit includes a capacitor C9 and a capacitor C10. A second end part of the capacitor C9 is connected to a first end part of the capacitor C10.

The second port of the energy storage/filter circuit being connected to the first port of the switching network specifically includes: The second end part of the inductor L1 is connected between the source of the MOS transistor Q1 and the drain of the MOS transistor Q2. The second end part of the inductor L2 is connected between the source of the MOS transistor Q3 and the drain of the MOS transistor Q4. The second end part of the inductor L3 is connected between the source of the MOS transistor Q5 and the drain of the MOS transistor Q6.

The second port of the switching network being connected to the first port of the energy storage circuit specifically includes: The drain of the MOS transistor Q5 is connected to a first end part of the capacitor C9. The source of the MOS transistor Q6 is connected to a second end part of the capacitor C10. The second end part of the switching transistor S3, the second end part of the switching transistor S4, and the second end part of the switching transistor S5 are all connected between the first end part of the capacitor C9 and the second end part of the capacitor C10.

The third port of the energy storage/filter circuit being connected to the first port of the energy storage circuit specifically includes: The second end part of the switching transistor S2 is connected between the second end part of the capacitor C9 and the first end part of the capacitor C10.

In a feasible embodiment, each of the first bridge, the second bridge, the third bridge, and the fourth bridge includes a first MOS transistor, a second MOS transistor, a third MOS transistor, and a fourth MOS transistor.

For each bridge, a drain of the third MOS transistor is connected to a drain of the first MOS transistor, a source of the first MOS transistor is connected to a drain of the second MOS transistor, a source of the third MOS transistor is connected to the drain of the second MOS transistor, and a source of the fourth MOS transistor is connected to a source of the second MOS transistor.

Each of the first resonant network and the second resonant network includes a first capacitor, a first inductor, a transformer, a second inductor, and a second capacitor.

For each resonant network, a second end part of the first capacitor is connected to a dotted terminal of a primary coil of the transformer by using the first inductor, and a dotted terminal of a secondary coil of the transformer is connected to a first end part of the second capacitor by using the second inductor.

The controlled terminal of each of the first bridge, the second bridge, the third bridge, and the fourth bridge includes a gate of the first MOS transistor, a gate of the second MOS transistor, a gate of the third MOS transistor, and a gate of the fourth MOS transistor.

In a feasible embodiment, the second port of the first bridge being connected to the first port of the first resonant network specifically includes: A first end part of the first capacitor of the first resonant network is connected between the source of the third MOS transistor and the drain of the fourth MOS transistor in the first bridge. An undotted terminal of the primary coil of the transformer of the first resonant network is connected between the source of the first MOS transistor and the drain of the second MOS transistor in the first bridge.

The second port of the first resonant network being connected to the first port of the second bridge specifically includes: A second end part of the second capacitor of the first resonant network is connected between the source of the first MOS transistor and the drain of the second MOS transistor in the second bridge. An undotted terminal of the secondary coil of the transformer of the first resonant network is connected between the source of the third MOS transistor and the drain of the fourth MOS transistor in the second bridge.

The second port of the third bridge being connected to the first port of the second resonant network specifically includes: A first end part of the first capacitor of the second resonant network is connected between the source of the third MOS transistor and the drain of the fourth MOS transistor in the third bridge. An undotted terminal of the primary coil of the transformer of the second resonant network is connected between the source of the first MOS transistor and the drain of the second MOS transistor in the third bridge.

The second port of the second resonant network being connected to the first port of the fourth bridge specifically includes: A second end part of the second capacitor of the second resonant network is connected between the source of the first MOS transistor and the drain of the second MOS transistor in the fourth bridge. An undotted terminal of the secondary coil of the transformer of the second resonant network is connected between the source of the third MOS transistor and the drain of the fourth MOS transistor in the fourth bridge.

In a feasible embodiment, the second port of the bidirectional conversion circuit being connected to the first port of the DC-DC circuit specifically includes:

The drain of the first MOS transistor in the first bridge is connected to the first end part of the capacitor C9. Both the source of the second MOS transistor in the first bridge and the drain of the first MOS transistor in the third bridge are connected between the second end part of the capacitor C9 and the first end part of the capacitor C10. The source of the second MOS transistor in the second bridge is connected to the second end part of the capacitor C10.

In a feasible embodiment, the controller controlling the energy storage/filter circuit and the switching network to be in the first state st1 specifically includes:

The controller controls the switching transistor S1 and the switching transistor S2 in the energy storage/filter circuit and the MOS transistor Q1, the MOS transistor Q2, the MOS transistor Q3, the MOS transistor Q4, the MOS transistor Q5, the MOS transistor Q6, the switching transistor S3, the switching transistor S4, and the switching transistor S5 in the switching network to be separately turned off and on according to a corresponding first preset rule, so as to implement:

The energy storage/filter circuit performs energy storage on a three-phase alternating current voltage that is input from the first port of the energy storage/filter circuit, and outputs a direct current voltage from the second port of the energy storage/filter circuit. The switching network performs power conversion on a direct current voltage that is input from the first port of the switching network, and outputs a converted direct current voltage from the second port of the switching network. The energy storage network performs energy storage on a direct current voltage that is input from the first port of the energy storage network, and outputs the second direct current voltage from the second port of the energy storage network.

In a feasible embodiment, the controller controlling the energy storage/filter circuit and the switching network to be in the fifth state st5 specifically includes:

The controller controls the switching transistor S1 and the switching transistor S2 in the energy storage/filter circuit and the MOS transistor Q1, the MOS transistor Q2, the MOS transistor Q3, the MOS transistor Q4, the MOS transistor Q5, the MOS transistor Q6, the switching transistor S3, the switching transistor S4, and the switching transistor S5 in the switching network to be separately turned off and on according to a corresponding second preset rule, so as to implement:

The energy storage network performs energy storage on the direct current voltage that is input from the second port of the energy storage network, and outputs the direct current voltage from the first port of the energy storage network. The switching network performs power conversion on the direct current voltage that is input from the second port of the switching network, and outputs the converted direct current voltage from the first port of the switching network. The energy storage/filter circuit filters the voltage that is input from the second port of the energy storage/filter circuit, and outputs the three-phase alternating current voltage from the first port of the energy storage/filter circuit.

In a feasible embodiment, the controller controlling the energy storage/filter circuit and the switching network to be in the third state st3 specifically includes:

The controller controls the switching transistor S1 in the energy storage/filter circuit to be turned on and the switching transistor S2 in the energy storage/filter circuit to be turned off, controls the switching transistor S5 in the switching network to be turned off and the MOS transistor Q5 and the MOS transistor Q6 in the switching network to be open-circuited, and controls the MOS transistor Q1, the MOS transistor Q2, the MOS transistor Q3, the MOS transistor Q4, the switching transistor S3, and the switching transistor SS4 in the switching network to be separately turned off and on according to a corresponding third preset rule, so as to implement:

The energy storage/filter circuit performs energy storage on a single-phase alternating current voltage that is input from the first port of the energy storage/filter circuit, and outputs a direct current voltage from the second port of the energy storage/filter circuit. The switching network performs power conversion on a direct current voltage that is input from the first port of the switching network, and outputs a converted direct current voltage from the second port of the switching network. The energy storage network performs energy storage on a direct current voltage that is input from the first port of the energy storage network, and outputs the second direct current voltage from the second port of the energy storage network.

In a feasible embodiment, the controller controlling the energy storage/filter circuit and the switching network to be in the sixth state st6 specifically includes:

The controller controls the switching transistor S1 in the energy storage/filter circuit to be turned on and the switching transistor S2 in the energy storage/filter circuit to be turned off, controls the switching transistor S3, the switching transistor S4, and the switching transistor S5 in the switching network to be all turned off and the MOS transistor Q5 and the MOS transistor Q6 in the switching network to be open-circuited, and controls the MOS transistor Q1, the MOS transistor Q2, the MOS transistor Q3, the MOS transistor Q4, the switching transistor S3, and the switching transistor SS4 in the switching network to be separately turned off and on according to a corresponding fourth preset rule, so as to implement:

The energy storage network performs energy storage on the direct current voltage that is input from the second port of the energy storage network, and outputs the direct current voltage from the first port of the energy storage circuit. The switching network performs power conversion on the direct current voltage that is input from the second port of the switching network, and outputs the converted direct current voltage from the first port of the switching network. The energy storage/filter circuit filters the voltage that is input from the second port of the energy storage/filter circuit, and outputs the single-phase alternating current voltage from the first port of the energy storage/filter circuit.

In a feasible embodiment, the controller controlling the energy storage/filter circuit and the switching network to be in the third state st3 specifically includes:

The controller controls the switching transistor S1 in the energy storage/filter circuit to be turned on and the switching transistor S2 in the energy storage/filter circuit to be turned off, controls the switching transistor S3, the switching transistor S4, and the switching transistor S5 in the switching network to be all turned off and the MOS transistor Q5 and the MOS transistor Q6 in the switching network to be open-circuited, and controls the MOS transistor Q1, the MOS transistor Q2, the MOS transistor Q3, the MOS transistor Q4, the switching transistor S3, and the switching transistor SS4 in the switching network to be separately turned off and on according to a corresponding fifth preset rule, so as to implement:

The energy storage/filter circuit performs energy storage on the single-phase alternating current voltage that is input from the first port of the energy storage/filter circuit, and outputs the direct current voltage from the second port of the energy storage/filter circuit. The switching network performs power conversion on the direct current voltage that is input from the first port of the switching network, and outputs the converted direct current voltage from the second port of the switching network. The energy storage network performs energy storage on the direct current voltage that is input from the first port of the energy storage network, and outputs the second direct current voltage from the second port of the energy storage circuit.

In a feasible embodiment, the controller controlling the energy storage/filter circuit and the switching network to be in the sixth state st6 specifically includes:

The controller controls the switching transistor S1 in the energy storage/filter circuit to be turned off and the switching transistor S2 in the energy storage/filter circuit to be turned on, controls the switching transistor S3, the switching transistor S4, and the switching transistor S5 in the switching network to be all turned off and the MOS transistor Q3, the MOS transistor Q4, the MOS transistor Q5, and the MOS transistor Q6 in the switching network to be all open-circuited, and controls the MOS transistor Q1 and the MOS transistor Q2 in the switching network to be separately turned off and on according to a corresponding sixth preset rule, so as to implement:

The energy storage network performs energy storage on the direct current voltage that is input from the second port of the energy storage network, and outputs the direct current voltage from the first port of the energy storage circuit. The switching network performs power conversion on the direct current voltage that is input from the second port of the switching network, and outputs the converted direct current voltage from the first port of the switching network. The energy storage/filter circuit filters the voltage that is input from the second port of the energy storage/filter circuit, and outputs the single-phase alternating current voltage from the first port of the energy storage/filter circuit.

In a feasible embodiment, the controller controlling the first bridge, the second bridge, the third bridge, and the fourth bridge to be in the second state st2 specifically includes:

The controller controls the MOS transistors in the first bridge, the second bridge, the third bridge, and the fourth bridge to be turned off and on according to a seventh preset rule, so as to implement:

The first bridge and the third bridge each are configured to perform power conversion on the direct current voltage that is input from the first port of the corresponding bridge, and output the converted direct current voltage from the second port of the corresponding bridge. The first resonant network and the second resonant network are configured to perform power conversion on the input direct current voltage, and output the converted direct current voltage. The second bridge and the fourth bridge each are configured to rectify the direct current voltage that is input from the first port of the corresponding bridge, and output the rectified direct current voltage from the second port of the corresponding bridge.

In a feasible embodiment, the controller controlling the first bridge, the second bridge, the third bridge, and the fourth bridge to be in the fourth state st4 specifically includes:

The controller controls the MOS transistors in the first bridge, the second bridge, the third bridge, and the fourth bridge to be turned off and on according to an eighth preset rule, so as to implement:

The second bridge and the fourth bridge each are configured to perform power conversion on the direct current voltage that is input from the second port of the corresponding bridge, and output the converted direct current voltage from the first port of the corresponding bridge. The first resonant network and the second resonant network are configured to perform power conversion on the input direct current voltage, and output the converted direct current voltage. The first bridge and the third bridge each are configured to rectify the direct current voltage that is input from the second port of the corresponding bridge, and output the rectified direct current voltage from the first port of the corresponding bridge.

In a feasible embodiment, the controller controlling the first bridge, the second bridge, the third bridge, and the fourth bridge to be in the second state st2 specifically includes:

The controller controls the MOS transistors in the third bridge to be short-circuited and the MOS transistors in the fourth bridge to be open-circuited, and controls the MOS transistors in the first bridge and the second bridge to be turned off and on according to a ninth preset rule, so as to implement:

The first bridge is configured to perform power conversion on the direct current voltage that is input from the first port of the bridge, and output the converted direct current voltage from the second port of the bridge. The first resonant network is configured to perform power conversion on the input direct current voltage, and output the converted direct current voltage. The second bridge is configured to rectify the direct current voltage that is input from the first port of the bridge and output the rectified direct current voltage from the second port of the bridge.

The controller controlling the first bridge, the second bridge, the third bridge, and the fourth bridge to be in the fourth state st4 specifically includes:

The controller controls the MOS transistors in the third bridge to be all short-circuited and the MOS transistors in the fourth bridge to be all open-circuited, and controls the MOS transistors in the first bridge and the second bridge to be turned off and on according to a tenth preset rule, so as to implement:

The second bridge is configured to perform power conversion on the direct current voltage that is input from the second port of the bridge, and output the converted direct current voltage from the first port of the bridge. The first resonant network is configured to perform power conversion on the input direct current voltage, and output the converted direct current voltage. The first bridge is configured to rectify the direct current voltage that is input from the second port of the bridge, and output the rectified direct current voltage from the first port of the bridge.

In a feasible embodiment, the controller controlling the first bridge, the second bridge, the third bridge, and the fourth bridge to be in the second state st2 specifically includes:

The controller controls the MOS transistors in the first bridge to be short-circuited and the MOS transistors in the second bridge to be open-circuited, and controls the MOS transistors in the third bridge and the fourth bridge to be turned off and on according to an eleventh preset rule, so as to implement:

The third bridge is configured to perform power conversion on the direct current voltage that is input from the first port of the bridge, and output the converted direct current voltage from the second port of the bridge. The second resonant network is configured to perform power conversion on the input direct current voltage, and output the converted direct current voltage. The fourth bridge is configured to rectify the direct current voltage that is input from the first port of the bridge and output the rectified direct current voltage from the second port of the bridge.

The controller controlling the first bridge, the second bridge, the third bridge, and the fourth bridge to be in the fourth state st4 specifically includes:

The controller controls the MOS transistors in the first bridge to be all short-circuited and the MOS transistors in the second bridge to be all open-circuited, and controls the MOS transistors in the third bridge and the fourth bridge to be turned off and on according to a twelfth preset rule, so as to implement:

The fourth bridge is configured to perform power conversion on the direct current voltage that is input from the second port of the bridge, and output the converted direct current voltage from the first port of the bridge. The second resonant network is configured to perform power conversion on the input direct current voltage, and output the converted direct current voltage. The third bridge is configured to rectify the direct current voltage that is input from the second port of the bridge, and output the rectified direct current voltage from the first port of the bridge.

According to a second aspect, an embodiment of this application provides an on-board charger, including the bidirectional energy transmission apparatus according to the first aspect.

According to a third aspect, an embodiment of this application provides an electric vehicle, including the bidirectional energy transmission apparatus according to the first aspect or the on-board charger according to the second aspect.

BRIEF DESCRIPTION OF DRAWINGS

To describe technical solutions in embodiments of this application or in the conventional technology more clearly, the following briefly describes the accompanying drawings for describing embodiments or the conventional technology.

DESCRIPTION OF EMBODIMENTS

To make a person skilled in the art understand the technical solutions in this application better, the following clearly describes the technical solutions in embodiments of this application with reference to the accompanying drawings in embodiments of this application.

Figure 1:
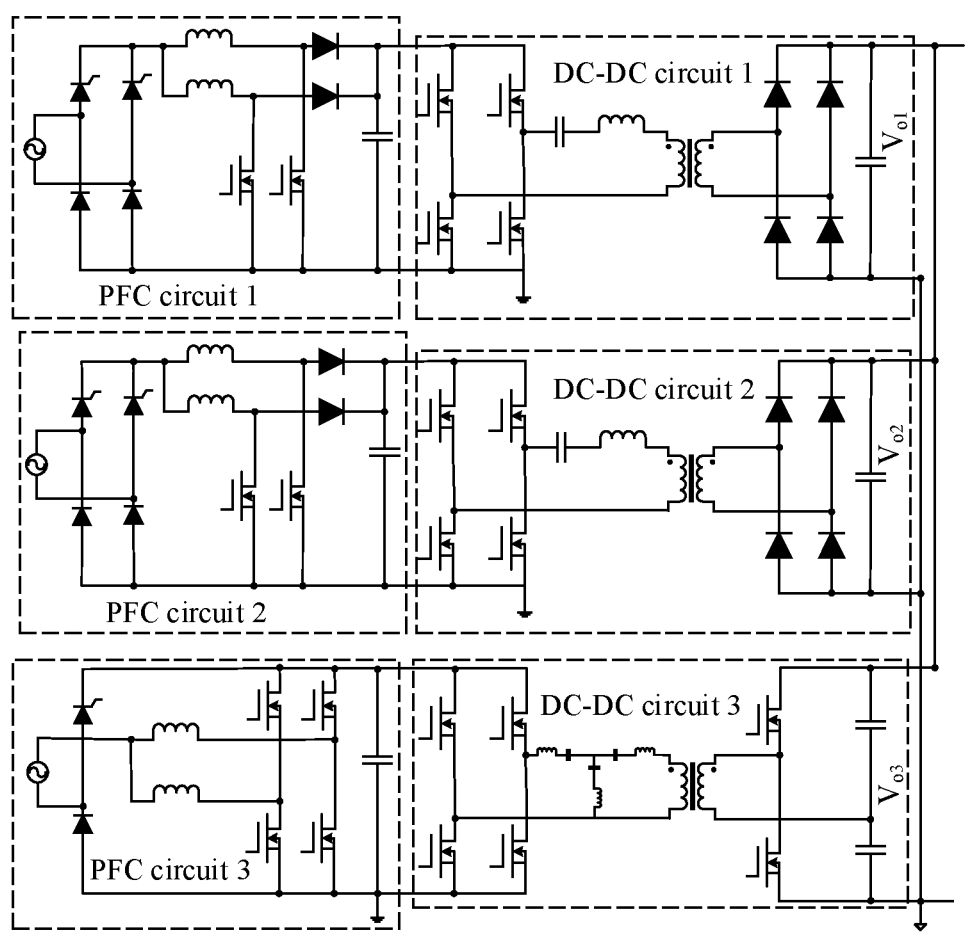
FIG. 1 is a schematic diagram of an energy transmission circuit in the conventional technology.
Figure 2:
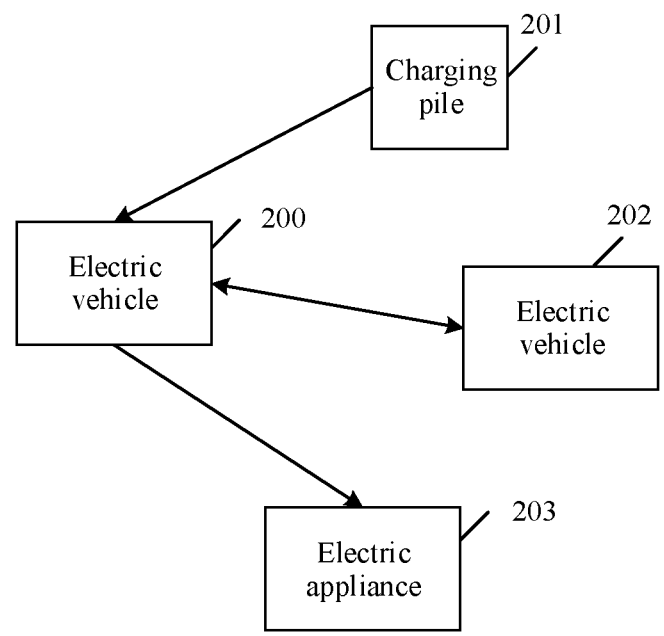
FIG. 2 is a schematic diagram of an application scenario of a bidirectional energy transmission apparatus according to an embodiment of this application.

FIG. 2 is a schematic diagram of an application scenario according to an embodiment of this application. As shown in FIG. 2, the application scenario includes a first electric vehicle 200, a charging pile 201, a second electric vehicle 202, and an electric appliance 203.

The first electric vehicle 200 and the second electric vehicle 202 each include a bidirectional energy transmission apparatus. The bidirectional energy transmission apparatus is configured to convert a three-phase alternating current voltage or a single-phase alternating current voltage into a direct current voltage, or convert a direct current voltage into a three-phase alternating current voltage or a single-phase alternating current voltage.

For example, the charging pile 201 may be a three-phase alternating current charging pile or a single-phase alternating current charging pile. The bidirectional energy transmission apparatus may convert a three-phase alternating current voltage of the three-phase alternating current charging pile or a single-phase alternating current voltage of the single-phase alternating current charging pile into a direct current voltage, to charge the first electric vehicle 200.

For another example, when the second electric vehicle 202 has insufficient power or has no power, and there is no charging pile around the second electric vehicle 202, the bidirectional energy transmission apparatus in the first electric vehicle 200 may convert a direct current voltage of a storage battery in the first electric vehicle 200 into a three-phase alternating current voltage or a single-phase alternating current voltage, and then the bidirectional energy transmission apparatus in the second electric vehicle 202 converts the three-phase alternating current voltage or the single-phase alternating current voltage into a direct current voltage, to charge the second electric vehicle 202.

For another example, the first electric vehicle 200 is a caravan. In the field, when the electric appliance 203 such as a rice cooker or an electromagnetic oven needs to be used for cooking, the bidirectional energy transmission apparatus in the first electric vehicle 200 may convert a direct current voltage of a storage battery in the first electric vehicle into a single-phase alternating current voltage, to supply power to the electric appliance.

The first electric vehicle 200 or the second electric vehicle 202 may be a pure electric vehicle, or a hybrid electric vehicle with electricity and other energy.

Figure 3A:
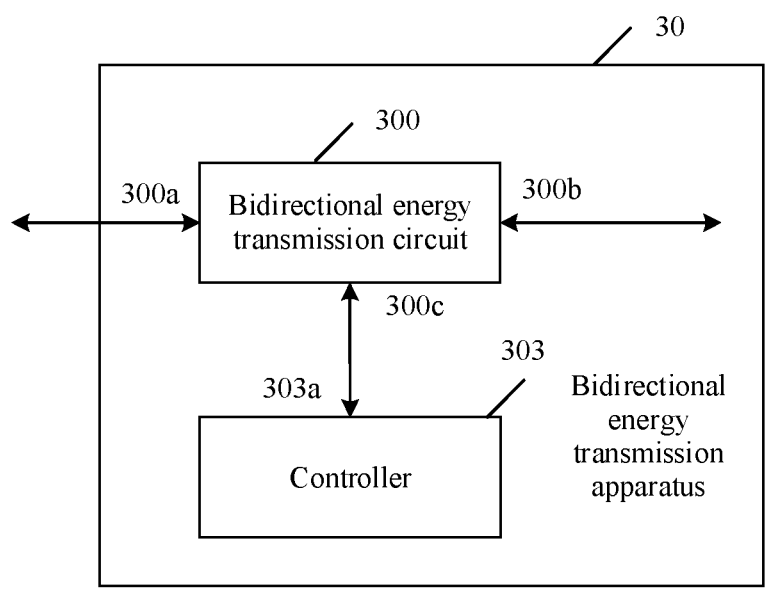
FIG. 3a is a schematic diagram of a structure of a bidirectional energy transmission apparatus according to an embodiment of this application.

FIG. 3a is a schematic diagram of a structure of a bidirectional energy transmission apparatus according to an embodiment of this application. As shown in FIG. 3a, the bidirectional energy transmission apparatus 30 includes a bidirectional energy transmission circuit 300 and a controller 303. A control terminal 303a of the controller 303 is connected to a controlled terminal 300c of the bidirectional energy transmission circuit 300.

The controller 303 is configured to control the bidirectional energy transmission circuit 300 to be in a rectification working state, so as to convert, into a first direct current voltage, a three-phase or single-phase alternating current voltage that is input from a first port 300a of the bidirectional energy transmission circuit 300, and output the first direct current voltage from a second port 300b of the bidirectional energy transmission circuit 300. Alternatively, the controller 303 is configured to control the bidirectional energy transmission circuit 300 to be in an inversion working state, so as to convert, into a three-phase or single-phase alternating current voltage, a first direct current voltage that is input from a second port 300b of the bidirectional energy transmission circuit 300, and output the three-phase or single-phase alternating current voltage from a first port 300a of the bidirectional energy transmission circuit.

Optionally, the rectification working state includes a first rectification working state and a second rectification working state. The controller 303 controlling the bidirectional energy transmission circuit 300 to be in the rectification working state specifically includes:

When it is detected that the three-phase alternating current voltage is input from the first port 300a of the bidirectional energy transmission circuit 300, the controller 303 controls the bidirectional energy transmission circuit 300 to be in the first rectification working state, so as to convert the three-phase alternating current voltage into the first direct current voltage, and output the first direct current voltage from the second port 300b of the bidirectional energy transmission circuit 300.

When it is detected that the single-phase alternating current voltage is input from the first port 300a of the bidirectional energy transmission circuit 300, the controller 303 controls the bidirectional energy transmission circuit 300 to be in the first rectification working state, so as to convert the single-phase alternating current voltage into the first direct current voltage, and output the first direct current voltage from the second port 300b of the bidirectional energy transmission circuit 300.

Optionally, the inversion working state includes a first inversion working state and a second inversion working state. The controller 303 controlling the bidirectional energy transmission circuit 300 to be in the inversion working state specifically includes:

When it is detected that the three-phase alternating current voltage is output from the first port 300a of the bidirectional energy transmission circuit 300, the controller 303 controls the bidirectional energy transmission circuit 300 to be in the first inversion working state, so as to convert, into the three-phase alternating current voltage, the first direct current voltage that is input from the second port 300b of the bidirectional energy transmission circuit 300, and output the three-phase alternating current voltage from the first port 300a of the bidirectional energy transmission circuit 300.

When it is detected that the single-phase alternating current voltage is output from the first port 300a of the bidirectional energy transmission circuit 300, the controller 303 controls the bidirectional energy transmission circuit 300 to be in the second inversion working state, so as to convert, into the single-phase alternating current voltage, the first direct current voltage that is input from the second port 300b of the bidirectional energy transmission circuit 300, and output the single-phase alternating current voltage from the first port 300a of the bidirectional energy transmission circuit 300.

It should be noted herein that, whether the three-phase alternating current voltage or the single-phase alternating current voltage is input or output from the first port 300a of the bidirectional energy transmission circuit 300 may be detected by detecting a type of a connector connected to the first port 300a of the bidirectional energy transmission circuit 300. When the connector is a four-hole connector, it is determined that the three-phase alternating current voltage is input or output from the first port 300a of the bidirectional energy transmission circuit 300. When the connector is a two-hole connector, it is determined that the single-phase alternating current voltage is input or output from the first port 300a of the bidirectional energy transmission circuit 300.

Figure 3B:
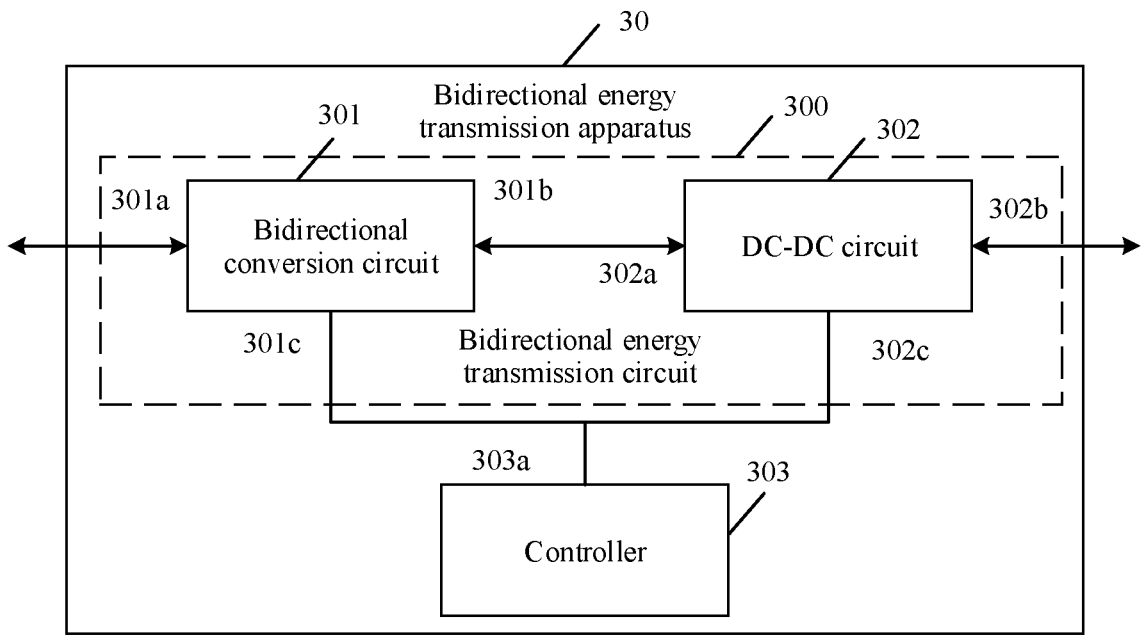
FIG. 3b is a schematic diagram of a structure of another bidirectional energy transmission apparatus according to an embodiment of this application.

As shown in FIG. 3b, a bidirectional energy transmission circuit 300 includes a bidirectional conversion circuit 301 and a DC-DC circuit 302. A second port 301b of the bidirectional conversion circuit 301 is connected to a first port 302a of the DC-DC circuit. A control terminal 303a of the controller 303 being connected to a controlled terminal 300c of the bidirectional energy transmission circuit 300 specifically includes: A control terminal 303b of the controller 303 is connected to a controlled terminal 301c of the bidirectional conversion circuit 301 and a controlled terminal 302c of the DC-DC circuit 302.

Specifically, the controller controlling the bidirectional energy transmission circuit to be in a first rectification state specifically includes:

The controller 303 controls the bidirectional conversion circuit 301 to be in a first working state, so as to convert, into a second direct current voltage, a three-phase alternating current voltage that is input from a first port 301a of the bidirectional conversion circuit 301, and output the second direct current voltage from the second port 301b of the bidirectional conversion circuit 301; and controls the DC-DC circuit 302 to be in a second working state, so as to convert, into a first direct current voltage, a second direct current voltage that is input from the first port 302a of the DC-DC circuit 302, and output the first direct current voltage from a second port 302b of the DC-DC circuit 302.

The controller 303 controlling the bidirectional energy transmission circuit 300 to be in a second rectification state specifically includes:

The controller 303 controls the bidirectional conversion circuit 301 to be in a third working state, so as to convert, into a second direct current voltage, a single-phase alternating current voltage that is input from a first port 301a of the bidirectional conversion circuit 301, and output the second direct current voltage from the second port 301b of the bidirectional conversion circuit 301; and controls the DC-DC circuit 302 to be in a second working state, so as to convert, into a first direct current voltage, a second direct current voltage that is input from the first port 302a of the DC-DC circuit 302, and output the first direct current voltage from a second port 302b of the DC-DC circuit 302. A voltage value of the first direct current voltage is different from or the same as a voltage value of the second direct current voltage.

Specifically, the controller 303 controlling the bidirectional energy transmission circuit 300 to be in a first inversion state specifically includes:

The controller 303 controls the DC-DC circuit 302 to be in a fourth working state, so as to convert, into a second direct current voltage, a first voltage that is input from the second port 302b of the DC-DC circuit 302, and output the second direct current voltage from the first port 302a of the DC-DC circuit 302, and controls the bidirectional conversion circuit 301 to be in a fifth working state, so as to convert, into a three-phase alternating current voltage, a second direct current voltage that is input from the second port 301b of the bidirectional conversion circuit 301, and output the three-phase alternating current voltage from the first port 301a of the bidirectional conversion circuit 301.

The controller 303 controlling the bidirectional energy transmission circuit to be in a second inversion state specifically includes:

The controller 303 controls the DC-DC circuit 302 to be in a fourth working state, so as to convert, into a second direct current voltage, a first voltage that is input from the second port 302b of the DC-DC circuit 302, and output the second direct current voltage from the first port 302a of the DC-DC circuit 302; and controls the bidirectional conversion circuit 301 to be in a sixth working state, so as to convert, into a single-phase alternating current voltage, a second direct current voltage that is input from the second port 301b of the bidirectional conversion circuit 301, and output the single-phase alternating current voltage from the first port 301a of the bidirectional conversion circuit 301.

When the first direct current voltage is the same as the second direct current voltage, the DC-DC circuit 302 plays an isolation role.

It should be noted herein that a process in which the three-phase alternating current voltage or the single-phase alternating current voltage is input from the first port 301a of the bidirectional conversion circuit 301 and the direct current voltage is output from the second port 302b of the DC-DC circuit 302 is referred to as a forward energy transmission process or a rectification process. A process in which the direct current voltage is input from the second port 302b of the DC-DC circuit 302 and the three-phase alternating current voltage or the single-phase alternating current voltage is output from the first port 301a of the bidirectional conversion circuit 301 is referred to a reverse energy transmission process or an inversion process.

When the three-phase alternating current voltage or the single-phase alternating current voltage is input from the first port 301a of the bidirectional conversion circuit 301 and the direct current voltage is output from the second port 301b of the bidirectional conversion circuit 301, the bidirectional conversion circuit 301 may be considered as a PFC circuit, and the circuit is configured to convert the alternating current voltage into the direct current voltage. When the direct current voltage is input from the second port 301b of the bidirectional conversion circuit 301, and the three-phase alternating current voltage or the single-phase alternating current voltage is output from the first port 301a of the bidirectional conversion circuit 301, the bidirectional conversion circuit 301 may be considered as an inverter circuit, and the circuit is configured to convert the direct current voltage into the three-phase or single-phase alternating current voltage.

The bidirectional energy transmission circuit 300 may convert the three-phase or single-phase alternating current voltage into the direct current voltage, or convert the direct current voltage into the three-phase or single-phase alternating current voltage.

For example, a three-phase alternating current voltage of 380 V is input into the bidirectional energy transmission circuit 300, that is, a three-phase alternating current voltage of 380 V is input from the first port 301a of the bidirectional conversion circuit 301, a direct current voltage of 660 V to 1000 V is output from the second port 301b of the bidirectional conversion circuit 301. For example, a direct current voltage of 800 V is output from the second port 301b of the bidirectional conversion circuit 301, because the second port 301b of the bidirectional conversion circuit 301 is connected to the first port 302a of the DC-DC circuit 302, a direct current voltage of 800 V is also input into the first port 302a of the DC-DC circuit 302, and a direct current voltage of 200 V to 500 V is output from the second port 302b of the DC-DC circuit 302. The same rule is applicable in a reverse direction.

It should be noted herein that the direct current voltage of 660 V to 1000 V and the direct current voltage of 800 V are merely examples, and are not intended to limit this application. Certainly, the direct current voltages may alternatively be other ranges or other values.

The first port 301a of the bidirectional conversion circuit 301 includes an A-phase port, a B-phase port, a C-phase port, and an N-phase port. When the three-phase alternating current voltage is input or output from the first port 301a of the bidirectional conversion circuit 301, the three-phase alternating current voltage is input or output through the A-phase port, the B-phase port, the C-phase port, and the N-phase port of the bidirectional conversion circuit 301; or when the single-phase alternating current voltage is input or output from the first port 301a of the bidirectional conversion circuit 301, the single-phase alternating current voltage is input or output through the A-phase port and the N-phase port of the bidirectional conversion circuit 301.

The following specifically describes specific structures of the bidirectional conversion circuit 301 and the DC-DC circuit 302.

Figure 4A:
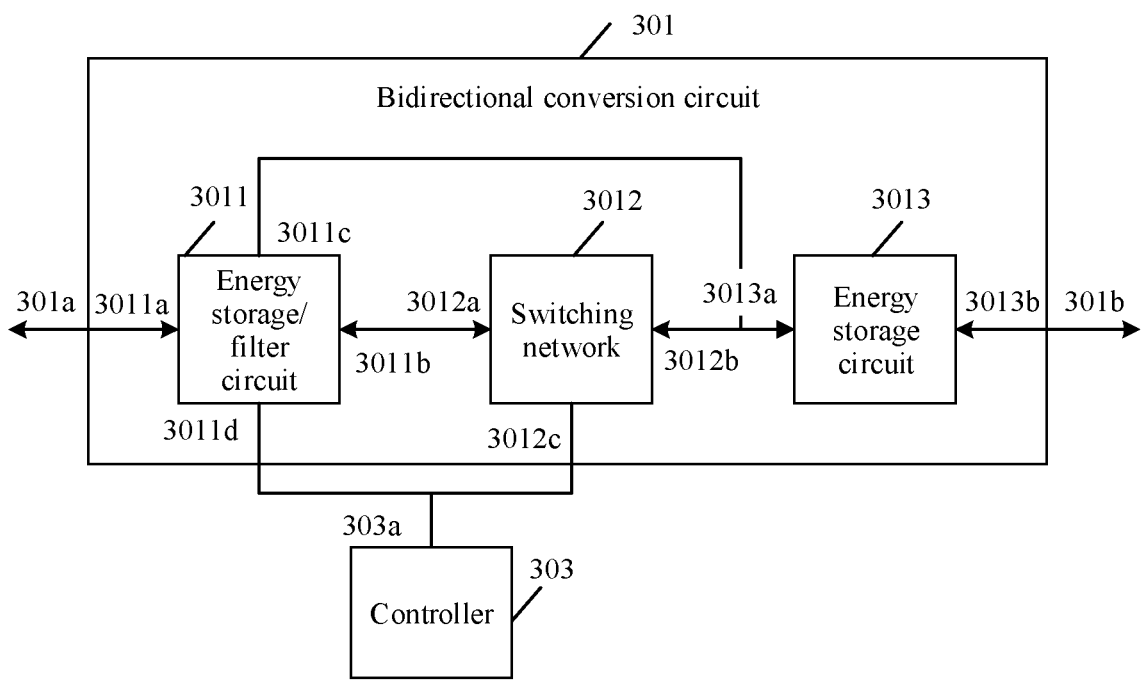
FIG. 4a is a schematic diagram of a structure of a bidirectional conversion circuit according to an embodiment of this application.

As shown in FIG. 4a, the bidirectional conversion circuit 301 includes an energy storage/filter circuit 3011, a switching network 3012, and an energy storage circuit 3013.

A first port 3011a of the energy storage/filter circuit 3011 is the first port 301a of the bidirectional conversion circuit 301. A second port 3011b of the energy storage/filter circuit 3011 is connected to a first port 3012a of the switching network 3012. A second port 3012b of the switching network 3012 is connected to a first port 3013a of the energy storage circuit 3013. A third port 3011c of the energy storage/filter circuit 3011 is connected to the first port 3013a of the energy storage circuit 3013. A second port 3013b of the energy storage circuit 3013 is the second port 301b of the bidirectional conversion circuit 301. A controlled terminal 301c of the bidirectional conversion circuit 301 includes a controlled terminal 3011d of the energy storage/filter circuit 3011 and a controlled terminal 3012c of the switching network 3012, that is, that the control terminal 303a of the controller 303 is connected to the controlled terminal 301c of the bidirectional conversion circuit 301 specifically means that the control terminal 303a of the controller 303 is connected to the controlled terminal 3011d of the energy storage/filter circuit 3011 and the controlled terminal 3012c of the switching network 3012.

Figure 4B:
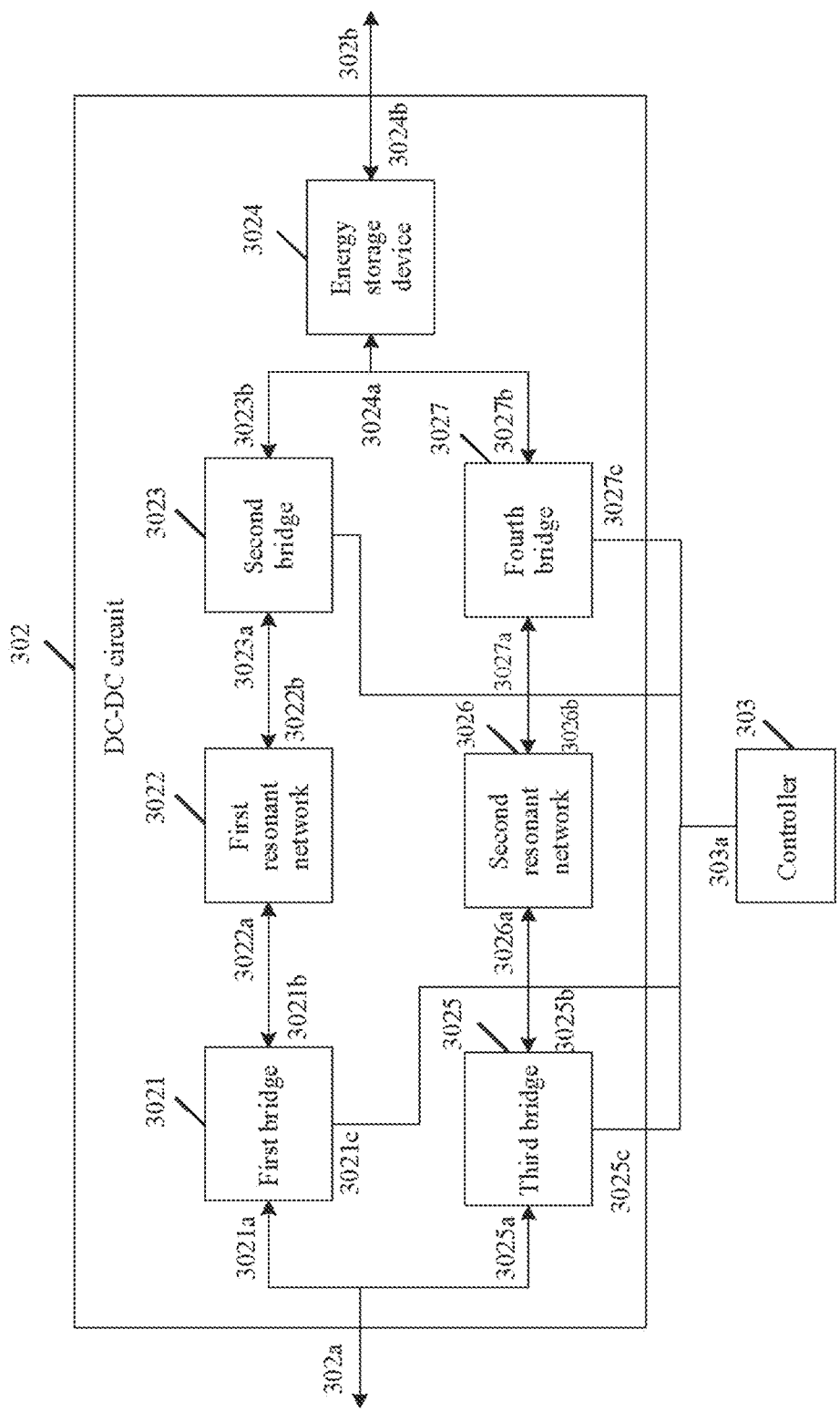
FIG. 4b is a schematic diagram of a structure of a DC-DC inverter circuit according to an embodiment of this application.

As shown in FIG. 4b, the DC-DC circuit 302 includes an energy storage device, four bridges, and two resonant networks. A second port 3021b of a first bridge 3021 is connected to a first port 3022a of a first resonant network 3022. A second port 3022b of the first resonant network 3022 is connected to a first port 3023a of a second bridge 3023. A second port 3025b of a third bridge 3025 is connected to a first port 3026a of a second resonant network 3026. A second port 3026b of the second resonant network 3026 is connected to a first port 3027a of a fourth bridge 3027. Both a second port 3023b of the second bridge 3023 and a second port 3027b of the fourth bridge 3027 are connected to a first port 3024a of the energy storage device 3024. The first port of the DC-DC circuit 302 includes a first port 3021a of the first bridge 3021 and a first port 3025a of the third bridge 3025. The second port 302b of the DC-DC circuit 302 is a second port 3024b of the energy storage device 3024. The controlled terminal 302c of the DC-DC circuit 302 includes a controlled terminal 3021c of the first bridge 3021, a controlled terminal 3023c of the second bridge 3023, a controlled terminal 3025c of the third bridge 3025, and a controlled terminal 3027c of the fourth bridge 3027, that is, that the control terminal 303a of the controller 303 is connected to the controlled terminal 302c of the DC-DC circuit 302 specifically means that the control terminal 303a of the controller 303 is connected to the controlled terminal 3021c of the first bridge 3021, the controlled terminal 3023c of the second bridge 3023, the controlled terminal 3025c of the third bridge 3025, and the controlled terminal 3027c of the fourth bridge 3027.

For the circuit structure shown in FIG. 4a, the controller 303 separately sends a control signal to the energy storage/filter circuit 3011 and the switching network 3012 in the bidirectional conversion circuit 301 by using the control terminal 303a of the controller 303, so that the bidirectional conversion circuit 301 implements conversion between different voltages.

Specifically, the controller 303 controlling the bidirectional conversion circuit 301 to be in the first working state specifically includes:

The controller 303 separately sends the control signal to the energy storage/filter circuit 3011 and the switching network 3012 by using the control terminal 303a of the controller 303, to control the energy storage/filter circuit 3011 and the switching network 3012 to be in a first state st1, so as to implement:

The energy storage/filter circuit 3011 performs energy storage on a three-phase alternating current voltage that is input from the first port 3011a of the energy storage/filter circuit 3011, and outputs a direct current voltage from the second port 3011b of the energy storage/filter circuit 3011. The switching network 3012 performs power conversion on a direct current voltage that is input from the first port 3012a of the switching network 3012, and outputs a converted direct current voltage from the second port 3012b of the switching network 3012. The energy storage network 3013 performs energy storage on a direct current voltage that is input from the first port 3013a of the energy storage network 3013, and outputs a second direct current voltage from the second port 3013b of the energy storage network 3013.

The controller 303 controlling the bidirectional conversion circuit 301 to be in the third working state specifically includes:

The controller 303 controls the energy storage/filter circuit 3011 and the switching network 3012 to be in a third state st3, so as to implement:

The energy storage/filter circuit 3011 performs energy storage on a single-phase alternating current voltage that is input from the first port 3011a of the energy storage/filter circuit 3011, and outputs a direct current voltage from the second port 3011b of the energy storage/filter circuit 3011. The switching network 3012 performs power conversion on a direct current voltage that is input from the first port 3012a of the switching network 3012, and outputs a converted direct current voltage from the second port 3012b of the switching network 3012. The energy storage network 3013 performs energy storage on a direct current voltage that is input from the first port 3013a of the energy storage network 3013, and outputs a second direct current voltage from the second port 3013b of the energy storage network 3013.

The controller 303 controlling the bidirectional conversion circuit 301 to be in the fifth working state specifically includes:

The controller 303 controlling the energy storage/filter circuit 3011 and the switching network to be in a fifth state st5, so as to implement:

The energy storage network 3013 performs energy storage on a direct current voltage that is input from the second port 3013b of the energy storage network 3013, and outputs a direct current voltage from the first port 3013a of the energy storage network 3013. The switching network 3012 performs power conversion on a direct current voltage that is input from the second port 3012b of the switching network 3012, and outputs a converted direct current voltage from the first port 3012*a* of the switching network 3012. The energy storage/filter circuit 3011 filters a direct current voltage that is input from the second port 3011*b* of the energy storage/filter circuit 3011, and outputs a three-phase alternating current voltage from the first port 3011*a* of the energy storage/filter circuit 3011.

The controller 303 controlling the bidirectional conversion circuit to be in the sixth working state specifically includes:

The controller 303 controlling the energy storage/filter circuit 3011 and the switching network 3012 to be in a sixth state st6, so as to implement:

The energy storage network 3013 performs energy storage on a direct current voltage that is input from the second port 3013*b* of the energy storage network 3013, and outputs a direct current voltage from the first port 3013*a* of the energy storage network 3013. The switching network 3012 performs power conversion on a direct current voltage that is input from the second port 3012*b* of the switching network 3012, and outputs a converted direct current voltage from the first port 3012*a* of the switching network 3012. The energy storage/filter circuit 3011 filters a direct current voltage that is input from the second port 3011*b* of the energy storage/filter circuit 3011, and outputs a single-phase alternating current voltage from the first port 3011*a* of the energy storage/filter circuit 3011.

For the circuit structure shown in FIG. 4*b*, the controller 303 separately sends a control signal to the first bridge 3021, the second bridge 3023, the third bridge 3025, and the fourth bridge 3027 in the DC-DC circuit 302 by using the control terminal 303*a* of the controller 303, to control the first bridge 3021, the second bridge 3023, the third bridge 3025, and the fourth bridge 3027 to be in different working states, so that the DC-DC circuit 302 implements conversion between different voltages.

Specifically, the controller 303 controlling the DC-DC circuit to be in the second working state specifically includes:

The controller 303 controls the first bridge 3021, the second bridge 3023, the third bridge 3025, and the fourth bridge 3027 to be in a second state st2, so as to implement:

the first bridge 3021 is configured to perform power conversion on a direct current voltage that is input from the first port 3021*a* of the bridge 3021, and output a converted direct current voltage from the second port 3021*b* of the bridge 3021; the first resonant network 3022 is configured to perform power conversion on an input direct current voltage, and output a converted direct current voltage; and the second bridge 3023 is configured to rectify a direct current voltage that is input from the first port 3023*a* of the bridge 3023, and output a rectified direct current voltage from the second port 3023*b* of the bridge 3023; and/or the third bridge 3025 is configured to perform power conversion on a direct current voltage that is input from the first port 3025*a* of the bridge, and output a converted direct current voltage from the second port 3025*b* of the bridge 3025; the second resonant network 3026 is configured to perform power conversion on an input direct current voltage, and output a converted direct current voltage; and the fourth bridge 3027 is configured to rectify a direct current voltage that is input from the first port 3027*a* of the bridge 3027, and output a rectified direct current voltage from the second port 3027*b* of the bridge 3027.

The second direct current voltage is the direct current voltage that is input from the first port 3021*a* of the first bridge 3021, or the direct current voltage that is input from the first port 3025*a* of the third bridge 3025, or a sum of the direct current voltage that is input from the first port 3021*a* of the first bridge 3021 and the direct current voltage that is input from the first port 3025*a* of the third bridge 3025.

The first direct current voltage is the direct current voltage that is output from the second port 3023*b* of the second bridge 3023, or the direct current voltage that is output from the second port 3027*b* of the fourth bridge 3027, or a sum of the direct current voltage that is output from the second port 3023*b* of the second bridge 3023 and the direct current voltage that is output from the second port 3027*b* of the fourth bridge 3027.

The controller 303 controlling the DC-DC circuit 302 to be in the fourth working state specifically includes:

The controller 303 controls the first bridge 3021, the second bridge 3023, the third bridge 3025, and the fourth bridge 3027 to be in a fourth state st4, so as to implement:

the second bridge 3023 is configured to perform power conversion on a direct current voltage that is input from the second port 3023*b* of the bridge 3023, and output a converted direct current voltage from the first port 3023*a* of the bridge 3023; the first resonant network 3022 is configured to perform power conversion on an input direct current voltage, and output a converted direct current voltage; and the first bridge 3021 is configured to rectify a direct current voltage that is input from the second port 3021*b* of the bridge 3021, and output a rectified direct current voltage from the first port 3021*a* of the bridge 3021; and/or the fourth bridge 3027 is configured to perform power conversion on a direct current voltage that is input from the second port 3027*b* of the bridge 3027, and output a converted direct current voltage from the first port 3027*a* of the bridge 3027; the second resonant network 3026 is configured to perform power conversion on an input direct current voltage, and output a converted direct current voltage; and the third bridge 3025 is configured to rectify a direct current voltage that is input from the second port 3025*b* of the bridge 3025, and output a rectified direct current voltage from the first port 3025*a* of the bridge 3025.

The second direct current voltage is the direct current voltage that is output from the first port 3021*a* of the first bridge 3021, or the direct current voltage that is output from the first port 3025*a* of the third bridge 3025, or a sum of the direct current voltage that is output from the first port 3021*a* of the first bridge 3021 and the direct current voltage that is output from the first port 3025*a* of the third bridge 3025.

The first direct current voltage is the direct current voltage that is input from the second port 3023*b* of the second bridge 3023, or the direct current voltage that is input from the second port 3027*b* of the fourth bridge 3027, or a sum of the direct current voltage that is input from the second port 3023*b* of the second bridge 3023 and the direct current voltage that is input from the second port 3027*b* of the fourth bridge 3027.

It should be noted herein that the first port 3021*a* of the first bridge 3021 and the first port 3025*a* of the third bridge 3025 together form the first port 302*a* of the DC-DC circuit 302. The second port 3024*b* of the energy storage device 3024 is the second port 302*b* of the DC-DC circuit 302. That the second port 301*b* of the bidirectional conversion circuit 301 is connected to the first port 302*a* of the DC-DC circuit 302 specifically means that the second port of the energy storage circuit 3013 in the bidirectional conversion circuit 301 is connected to the first port 3021a of the first bridge 3021 and the first port 3025a of the third bridge 3025 in the DC-DC circuit 302.

Figure 5A:
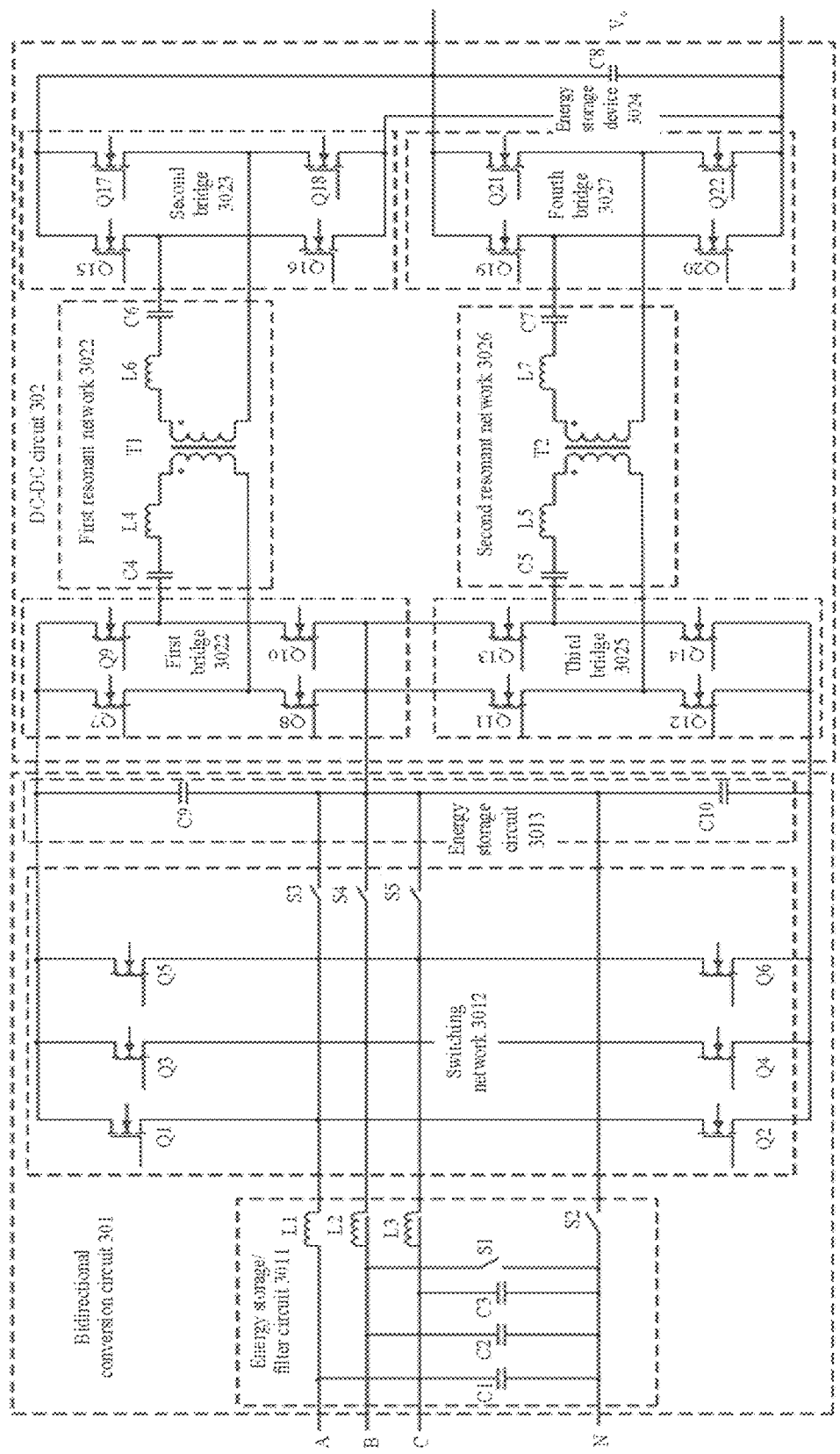
FIG. 5a is a schematic diagram of a specific structure of a bidirectional energy transmission circuit according to an embodiment of this application.

Specifically, as shown in FIG. 5a, the energy storage/filter circuit 3011 includes a capacitor C1, a capacitor C2, a capacitor C3, an inductor L1, an inductor L2, an inductor L3, a switching transistor S1, and a switching transistor S2.

A first end part of the inductor L1 is connected to a first end part of the switching transistor S2 by using the capacitor C1. A first end part of the inductor L2 is connected to the first end part of the switching transistor S2 by using the capacitor C2 and the switching transistor S1 that are connected in parallel. The capacitor C2 and a first end part of the capacitor L3 are connected to the first end part of the switching transistor S2 by using the capacitor C3. The first end part of the inductor L1, the first end part of the inductor L2, and the first end part of the inductor L3 are respectively the A-phase port, the B-phase port, and the C-phase port. The first end part of the switching transistor S2 is the N-phase port. A second end part of the inductor L1, a second end part of the inductor L2, and a second end part of the inductor L3 form the second port of the energy storage/filter circuit. A second end part of the switching transistor S2 is the third port 3011c of the energy storage/filter circuit 3011. The controlled terminal 3011d of the energy storage/filter circuit 3011 includes a controlled terminal of the switching transistor S1 and a controlled terminal of the switching transistor S2.

As shown in FIG. 5a, the switching network 3012 includes a MOS transistor Q1, a MOS transistor Q2, a MOS transistor Q3, a MOS transistor Q4, a MOS transistor Q5, a MOS transistor Q6, a switching transistor S3, a switching transistor S4, and a switching transistor S5.

Both a drain of the MOS transistor Q1 and a drain of the MOS transistor Q3 are connected to a drain of the MOS transistor Q5. Both a source of the MOS transistor Q2 and a source of the MOS transistor Q4 are connected to a source of the MOS transistor Q6. A source of the MOS transistor Q1 is connected to a drain of the MOS transistor Q2. A source of the MOS transistor Q3 is connected to a drain of the MOS transistor Q4. A source of the MOS transistor Q5 is connected to a drain of the MOS transistor Q6. A first end part of the switching transistor S3 is connected between the source of the MOS transistor Q1 and the drain of the MOS transistor Q2. A first end part of the switching transistor S4 is connected between the source of the MOS transistor Q3 and the drain of the MOS transistor Q4. A first end part of the switching transistor S5 is connected between the source of the MOS transistor Q5 and the drain of the MOS transistor Q6. The source of the MOS transistor Q1, the source of the MOS transistor Q3, and the source of the MOS transistor Q5 form the first port 3012a of the switching network 3012. The drain of the MOS transistor Q5, the source of the MOS transistor Q6, a second end part of the switching transistor S3, a second end part of the switching transistor S4, and a second end part of the switching transistor S5 form the second port 3012b of the switching network 3012.

That the second port 3011b of the energy storage/filter circuit 3011 is connected to the first port 3012a of the switching network 3012 specifically means that the second end part of the inductor L1 is connected between the source of the MOS transistor Q1 and the drain of the MOS transistor Q2, the second end part of the inductor L2 is connected between the source of the MOS transistor Q3 and the drain of the MOS transistor Q4, and the second end part of the inductor L3 is connected between the source of the MOS transistor Q5 and the drain of the MOS transistor Q6.

It should be noted herein that the switching transistor in this application may be implemented by using two serially connected MOS transistors, and a controlled terminal of the switching transistor is a gate of each of the two MOS transistors.

As shown in FIG. 5a, the energy storage circuit includes a capacitor C9 and a capacitor C10. A second end part of the capacitor C9 is connected to a first end part of the capacitor C10.

The second port 3011b of the energy storage/filter circuit 3011 being connected to the first port 3012a of the switching network 3012 specifically includes: The second end part of the inductor L1 is connected between the source of the MOS transistor Q1 and the drain of the MOS transistor Q2. The second end part of the inductor L2 is connected between the source of the MOS transistor Q3 and the drain of the MOS transistor Q4. The second end part of the inductor L3 is connected between the source of the MOS transistor Q5 and the drain of the MOS transistor Q6.

The second port 3012b of the switching network 3012 being connected to the first port 3013a of the energy storage circuit 3013 specifically includes: The drain of the MOS transistor Q5 is connected to a first end part of the capacitor C9. The source of the MOS transistor Q6 is connected to a second end part of the capacitor C10. The second end part of the switching transistor S3, the second end part of the switching transistor S4, and the second end part of the switching transistor S5 are all connected between the first end part of the capacitor C9 and the second end part of the capacitor C10.

The third port 3011c of the energy storage/filter circuit 3011 being connected to the first port 3013a of the energy storage circuit 3013 specifically includes: The second end part of the switching transistor S2 is connected between the second end part of the capacitor C9 and the first end part of the capacitor C10.

As shown in FIG. 5a, the first bridge 3021 includes a MOS transistor Q7, a MOS transistor Q8, a MOS transistor Q9, and a MOS transistor Q10. A drain of the MOS transistor Q7 is connected to a drain of the MOS transistor Q9. A source of the MOS transistor Q7 is connected to a drain of the MOS transistor Q8. A source of the MOS transistor Q9 is connected to a drain of the MOS transistor Q10. A source of the MOS transistor Q10 is connected to a source of the MOS transistor Q8.

The first resonant network 3022 includes a capacitor C4, an inductor L4, a transformer T1, a capacitor C6, and an inductor L6. A second end part of the capacitor C4 is connected to a dotted terminal of a primary coil of the transformer T1 by using the inductor L4. A dotted terminal of a secondary coil of the transformer T1 is connected to a first end part of the capacitor C6 by using the inductor L6.

It should be noted herein that, that the first port 3022a of the first resonant network 3022 is connected to the second port 3021b of the first bridge 3021 specifically means that a first end part of the capacitor C4 in the first resonant network 3022 is connected between the source of the MOS transistor Q9 and the drain of the MOS transistor Q10 in the first bridge 3021, and an undotted terminal of the primary coil of the transformer T1 in the first resonant network 3022 is connected between the source of the MOS transistor Q7 and the drain of the MOS transistor Q8 in the first bridge 3021.

The second bridge includes a MOS transistor Q15, a MOS transistor Q16, a MOS transistor Q17, and a MOS transistor Q18. A drain of the MOS transistor Q15 is connected to a drain of the MOS transistor Q17. A source of the MOS transistor Q15 is connected to a drain of the MOS transistor Q16. A source of the MOS transistor Q17 is connected to a drain of the MOS transistor Q18. A source of the MOS transistor Q16 is connected to a source of the MOS transistor Q18.

A gate of the MOS transistor Q7, a gate of the MOS transistor Q8, a gate of the MOS transistor Q9, and a gate of the MOS transistor Q10 in the first bridge 3021 form the controlled terminal 3021c of the first bridge 3021. A gate of the MOS transistor Q15, a gate of the MOS transistor Q16, a gate of the MOS transistor Q17, and a gate of the MOS transistor Q18 in the second bridge 3023 form the controlled terminal 3023c of the second bridge 3023.

It should be noted herein that, that the second port 3022b of the first resonant network 3022 is connected to the first port 3023a of the second bridge 3023 specifically means that a second end part of the capacitor C6 in the first resonant network 3022 is connected between the source of the MOS transistor Q15 and the drain of the MOS transistor Q16 in the second bridge 3023, and an undotted terminal of the secondary coil in the first resonant network 3022 is connected between the source of the MOS transistor Q17 and the drain of the MOS transistor Q18 in the second bridge 3023.

As shown in FIG. 5a, the third bridge 3025 includes a MOS transistor Q11, a MOS transistor Q12, a MOS transistor Q13, and a MOS transistor Q14. A drain of the MOS transistor Q11 is connected to a drain of the MOS transistor Q13. A source of the MOS transistor Q11 is connected to a drain of the MOS transistor Q12. A source of the MOS transistor Q13 is connected to a drain of the MOS transistor Q14. A source of the MOS transistor Q14 is connected to a source of the MOS transistor Q12.

The second resonant network 3026 includes a capacitor C5, an inductor L5, a transformer T2, a capacitor C7, and an inductor L7. A second end part of the capacitor C5 is connected to a first end part of the inductor L5. A second end part of the inductor L5 is connected to a dotted terminal of a primary coil of the transformer T2. A dotted terminal of a secondary coil of the transformer T2 is connected to a first end part of the inductor L7. A second end part of the inductor L7 is connected to a first end part of the capacitor C7.

It should be noted herein that, that the first port 3026a of the second resonant network 3026 is connected to the second port 3025b of the second bridge 3025 specifically means that a first end part of the capacitor C5 in the second resonant network 3026 is connected between the source of the MOS transistor Q13 and the drain of the MOS transistor Q14 in the second bridge 3025, and an undotted terminal of the primary coil of the transformer T2 in the second resonant network 3026 is connected between the source of the MOS transistor Q11 and the drain of the MOS transistor Q12 in the second bridge 3025.

The fourth bridge includes a MOS transistor Q19, a MOS transistor Q20, a MOS transistor Q21, and a MOS transistor Q22. A drain of the MOS transistor Q19 is connected to a drain of the MOS transistor Q21. A source of the MOS transistor Q19 is connected to a drain of the MOS transistor Q20. A source of the MOS transistor Q21 is connected to a drain of the MOS transistor Q22. A source of the MOS transistor Q20 is connected to a source of the MOS transistor Q22.

A gate of the MOS transistor Q11, a gate of the MOS transistor Q12, a gate of the MOS transistor Q13, and a gate of the MOS transistor Q14 in the third bridge 3025 form the controlled terminal 3025c of the third bridge 3025. A gate of the MOS transistor Q19, a gate of the MOS transistor Q20, a gate of the MOS transistor Q21, and a gate of the MOS transistor Q22 in the fourth bridge 3027 form the controlled terminal 3027c of the fourth bridge 3027.

It should be noted herein that, that the second port 3026b of the second resonant network 3026 is connected to the first port 3027a of the fourth bridge 3027 specifically means that a second end part of the capacitor C7 in the second resonant network 3026 is connected between the source of the MOS transistor Q19 and the drain of the MOS transistor Q20 in the fourth bridge 3027. An undotted terminal of the secondary coil in the second resonant network 3026 is connected between the source of the MOS transistor Q21 and the drain of the MOS transistor Q22 in the fourth bridge 3027.

The second port 3013b of the energy storage circuit 3013 being connected to the first port 3021a of the first bridge 3021 and the first port 3025a of the third bridge 3025 specifically includes:

The first end part of the capacitor C9 is connected to the drain of the MOS transistor Q7. The second end part of the capacitor C10 is connected to the source of the MOS transistor Q12. Both the source of the MOS transistor Q8 and the drain of the MOS transistor Q11 are connected between the second end part of the capacitor C9 and the first end part of the capacitor C10.

As shown in FIG. 5a, the energy storage device 3024 may be a capacitor, for example, a capacitor C8. The capacitor C8 is not only configured to store energy, but also configured to filter an input or output voltage.

That the second port 3023b of the second bridge 3023 is connected to the first port 3024a of the energy storage device 3024 specifically means that the drain of the MOS transistor Q17 and the source of the MOS transistor Q18 in the second bridge 3023 are respectively connected to a first end part and a second end part of the capacitor C8. That the second port 3027b of the fourth bridge 3027 is connected to the first port 3024a of the energy storage device 3024 specifically means that the drain of the MOS transistor Q21 and the source of the MOS transistor Q22 in the fourth bridge 3027 are respectively connected to the first end part and the second end part of the capacitor C8.

Figure 5B:
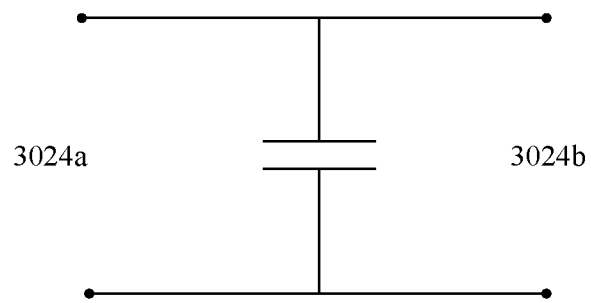
FIG. 5b is a schematic diagram of input and output ports of an energy storage device according to an embodiment of this application.

It should be noted herein that, that when the energy storage device 3024 is a capacitor, a voltage is input from the first port 3024a or the second port 3024b of the energy storage device 3024 specifically means that a voltage is input from different sides of the capacitor, as shown in FIG. 5b.

Based on the circuit shown in FIG. 5a, working states of components when conversion between different voltages is implemented are specifically described.

1. Three-phase alternating current voltage to direct current voltage:

In this case, the controller 303 controlling the energy storage/filter circuit 3011 and the switching network 3012 to be in the first state st1 and controlling the DC-DC circuit to be in the second state st2 specifically includes:

The controller 303 controls the switching transistor S1 and the switching transistor S2 in the energy storage/filter circuit 3011 and the MOS transistor Q1, the MOS transistor Q2, the MOS transistor Q3, the MOS transistor Q4, the MOS transistor Q5, the MOS transistor Q6, the switching transistor S3, the switching transistor S4, and the switching transistor S5 in the switching network 3012 to be separately turned off and on according to a corresponding first preset rule, so as to implement:

The energy storage/filter circuit 3011 performs energy storage on the three-phase alternating current voltage that is input from the first port of the energy storage/filter circuit 3011, and outputs the direct current voltage from the second port of the energy storage/filter circuit 3011. The switching network 3012 performs power conversion on the direct current voltage that is input from the first port 3012a of the switching network 3012, and outputs the converted direct current voltage from the second port 3012b of the switching network 3012. The energy storage network 3013 performs energy storage on the direct current voltage that is input from the first port 3013a of the energy storage network 3013, and outputs the second direct current voltage from the second port 3013b of the energy storage network 3013.

The controller 303 controlling the first bridge 3021, the second bridge 3023, the third bridge 3025, and the fourth bridge 3027 to be in the second state st2 specifically includes:

The controller controls the MOS transistors in the first bridge 3021, the second bridge 3023, the third bridge 3025, and the fourth bridge 3027 to be turned off and on according to a seventh preset rule, so as to implement:

The first bridge 3021 and the third bridge 3025 each are configured to perform power conversion on the direct current voltage that is input from the first port of the corresponding bridge, and output the converted direct current voltage from the second port of the corresponding bridge. The first resonant network 3022 and the second resonant network 3026 are configured to perform power conversion on the input direct current voltage and output the converted direct current voltage. The second bridge 3023 and the fourth bridge 3027 each are configured to rectify the direct current voltage that is input from the first port of the corresponding bridge, and output the rectified direct current voltage from the second port of the corresponding bridge.

2. Direct current voltage to three-phase alternating current voltage:

As shown in FIG. 5a, in this case, the controller 303 controlling the first bridge 3021, the second bridge 3023, the third bridge 3025, and the fourth bridge 3027 to be in the fourth state st4 specifically includes:

The controller 303 controls the MOS transistors in the first bridge 3021, the second bridge 3023, the third bridge 3025, and the fourth bridge 3027 to be turned off and on according to an eighth preset rule, so as to implement:

The second bridge 3023 and the fourth bridge 3027 each are configured to perform power conversion on the direct current voltage that is input from the second port of the corresponding bridge, and output the converted direct current voltage from the first port of the corresponding bridge. The first resonant network 3022 and the second resonant network 3026 are configured to perform power conversion on the input direct current voltage and output the converted direct current voltage. The first bridge 3021 and the third bridge 3025 each are configured to rectify the direct current voltage that is input from the second port of the corresponding bridge, and output the rectified direct current voltage from the first port of the corresponding bridge.

The controller 303 controlling the energy storage/filter circuit 3011 and the switching network 3012 to be in the fifth state st5 specifically includes:

The controller 303 controls the switching transistor S1 and the switching transistor S2 in the energy storage/filter circuit 3011 and the MOS transistor Q1, the MOS transistor Q2, the MOS transistor Q3, the MOS transistor Q4, the MOS transistor Q5, the MOS transistor Q6, the switching transistor S3, the switching transistor S4, and the switching transistor S5 in the switching network 3012 to be separately turned off and on according to a corresponding second preset rule, so as to implement:

The energy storage network 3013 performs energy storage on the direct current voltage that is input from the second port 301b of the energy storage network 3013, and outputs the direct current voltage from the first port 3013a of the energy storage network 3013. The switching network 3012 performs power conversion on the direct current voltage that is input from the second port 3012b of the switching network 3012, and outputs the converted direct current voltage from the first port 3012a of the switching network 3012. The energy storage/filter circuit 3011 filters the voltage that is input from the second port 3011b of the energy storage/filter circuit 3011, and outputs the three-phase alternating current voltage from the first port 3011a of the energy storage/filter circuit 3011.

The circuit shown in FIG. 5a may implement bidirectional conversion of the three-phase alternating current voltage to the direct current voltage. When energy flows forward (that is, the three-phase alternating current voltage is converted into the direct current voltage), the three-phase alternating current voltage is input from the A-phase port, the B-phase port, the C-phase port, and the N-phase port of the bidirectional conversion circuit 301 (that is, from the first port 301a of the bidirectional conversion circuit 301, that is, from the first port 3011a of the energy storage/filter circuit 3011), and the direct current voltage is output from the second port 302b Vo of the DC-DC circuit 302 (that is, from the second port 3024b of the energy storage device 3024). The bidirectional conversion circuit 301 is a conventional Vienna rectifier circuit or PFC circuit. The voltage on the capacitor C9 and the capacitor C10 is the direct current voltage. The DC-DC circuit 302 is a full-bridge+CLLC circuit. When energy reversely flows (that is, the direct current voltage is converted into the three-phase alternating current voltage), the direct current voltage is input from the second port Vo of the DC-DC circuit 302, and the three-phase alternating current voltage is output from the A-phase port, the B-phase port, the C-phase port, and the N-phase port of the bidirectional conversion circuit 301.

It should be noted herein that bridges (including the first bridge, the second bridge, the third bridge, and the fourth bridge) in the DC-DC circuit may also be half-bridge circuits or related deformable circuits.

It should be noted that the bidirectional conversion circuit and the DC-DC circuit are not limited to the structure shown in FIG. 5a, and may also be a bidirectional conversion circuit and a DC-DC circuit of another structure.

When bidirectional conversion of the single-phase alternating current voltage to the direct current voltage is implemented, some components of the circuit shown in FIG. 5a are in a non-working state.

Figure 6:
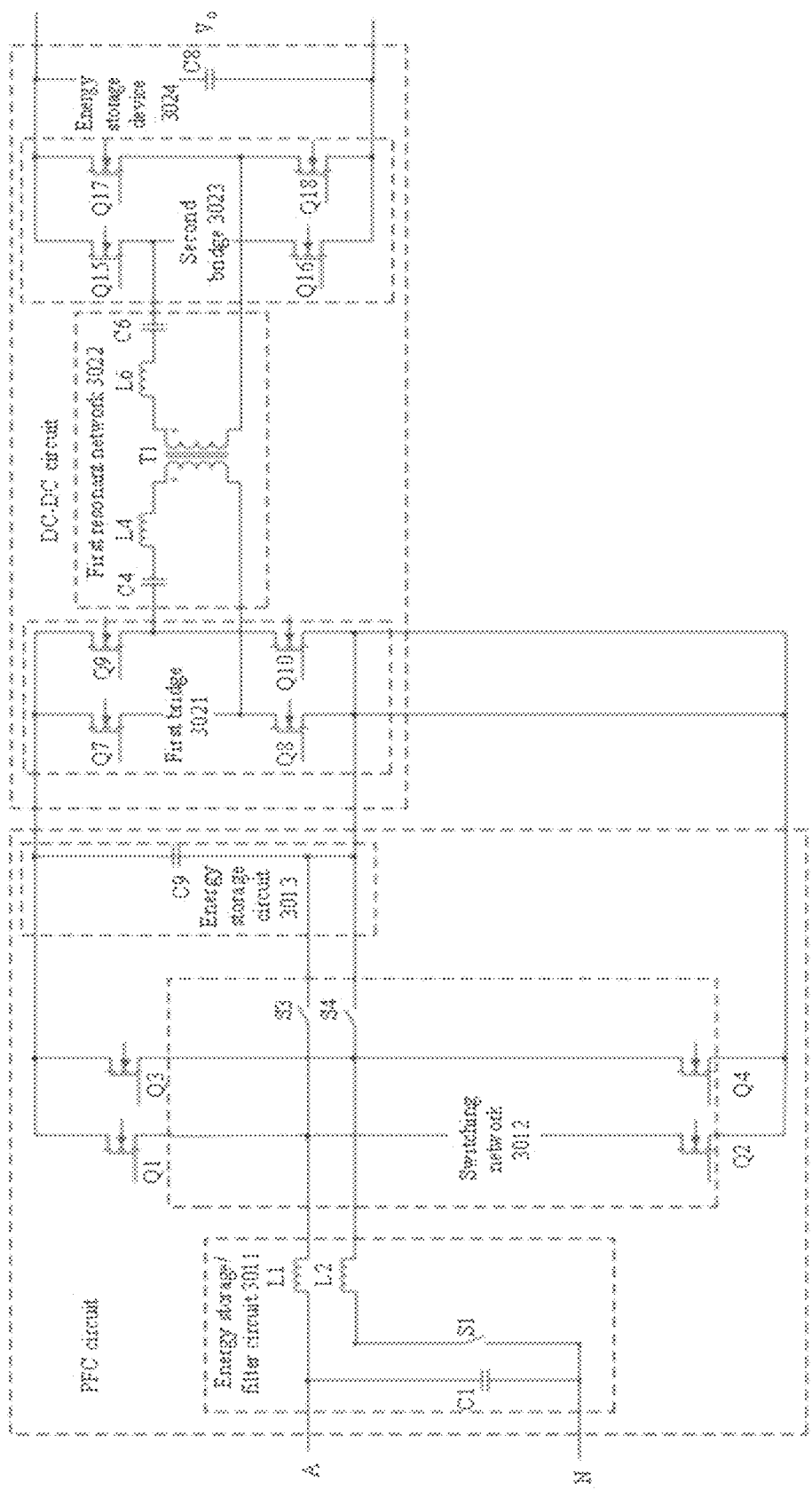
FIG. 6 is a schematic diagram of a specific structure of another bidirectional energy transmission circuit according to an embodiment of this application.

3. Single-phase alternating current voltage to direct current voltage:

Optionally, as shown in FIG. 6, the controller 303 controlling the energy storage/filter circuit 3011 and the switching network 3012 to be in the third state st3 specifically includes:

The controller 303 controls the switching transistor S1 in the energy storage/filter circuit 3011 to be turned on and the switching transistor S2 in the energy storage/filter circuit 3011 to be turned off, controls the switching transistor S5 in the switching network 3012 to be turned off and the MOS transistor Q5 and the MOS transistor Q6 in the switching network 3012 to be open-circuited, and controls the MOS transistor Q1, the MOS transistor Q2, the MOS transistor Q3, the MOS transistor Q4, the switching transistor S3, and the switching transistor SS4 in the switching network 3012 to be separately turned off and on according to a corresponding third preset rule, so as to implement:

The energy storage/filter circuit 3011 performs energy storage on a single-phase alternating current voltage that is input from the first port 3011*a* of the energy storage/filter circuit 3011, and outputs a direct current voltage from the second port 3011*b* of the energy storage/filter circuit 3011. The switching network 3012 performs power conversion on a direct current voltage that is input from the first port 3012*a* of the switching network 3012, and outputs a converted direct current voltage from the second port 3012*b* of the switching network 3012. The energy storage network 3013 performs energy storage on a direct current voltage that is input from the first port 3013*a* of the energy storage network 3013, and outputs a second direct current voltage from the second port 3013*b* of the energy storage network 3013.

The controller 303 controlling the first bridge 3021, the second bridge 3023, the third bridge 3025, and the fourth bridge 3027 to be in the second state st2 specifically includes:

As shown in FIG. 6, the controller controls the MOS transistors in the third bridge 3025 to be short-circuited and the MOS transistors in the fourth bridge 3027 to be open-circuited, and controls the MOS transistors in the first bridge and the second bridge to be turned off and on according to a ninth preset rule, so as to implement:

The first bridge 3021 is configured to perform power conversion on the direct current voltage that is input from the first port 3021*a* of the bridge 3021, and output the converted direct current voltage from the second port 3021*b* of the bridge 3021. The first resonant network 3022 is configured to perform power conversion on the input direct current voltage, and output the converted direct current voltage. The second bridge 3023 is configured to rectify the direct current voltage that is input from the first port 3023*a* of the bridge 3023, and output the rectified direct current voltage from the second port 3023*b* of the bridge 3023.

Figure 8:
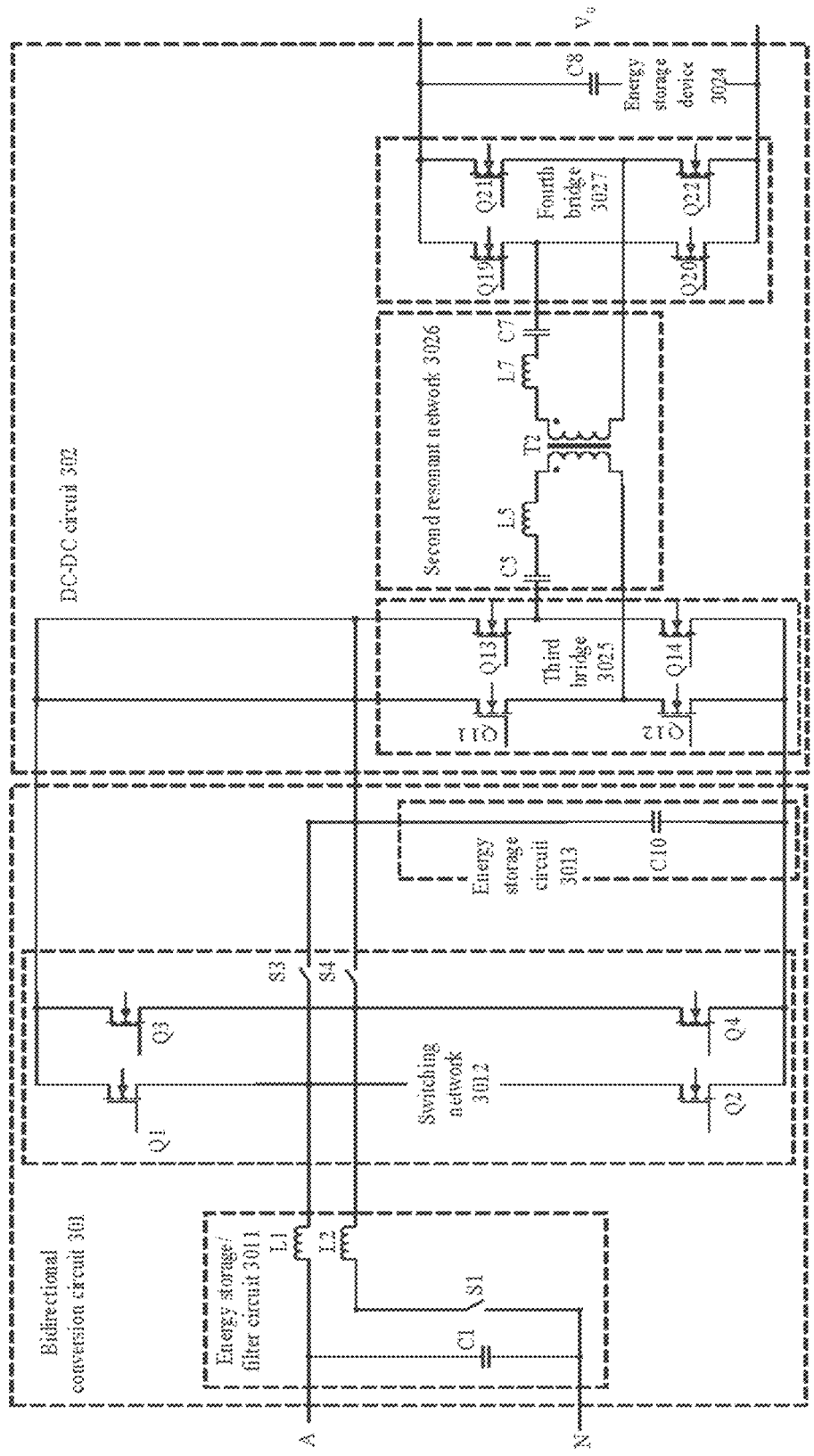
FIG. 8 is a schematic diagram of a specific structure of another bidirectional energy transmission circuit according to an embodiment of this application.

Alternatively,
 as shown in FIG. 8, the controller controls the MOS transistors in the first bridge 3021 to be short-circuited and the MOS transistors in the second bridge 3023 to be open-circuited, and controls the MOS transistors in the third bridge and the fourth bridge to be turned off and on according to an eleventh preset rule, so as to implement:

The third bridge 3025 is configured to perform power conversion on the direct current voltage that is input from the first port 3025*a* of the bridge 3025, and output the converted direct current voltage from the second port 3025*b* of the bridge 3025. The second resonant network 3026 is configured to perform power conversion on the input direct current voltage and output the converted direct current voltage. The fourth bridge 3027 is configured to rectify the direct current voltage that is input from the first port 3027*a* of the bridge 3027, and output the rectified direct current voltage from the second port 3027*b* of the bridge 3027.

Figure 10:
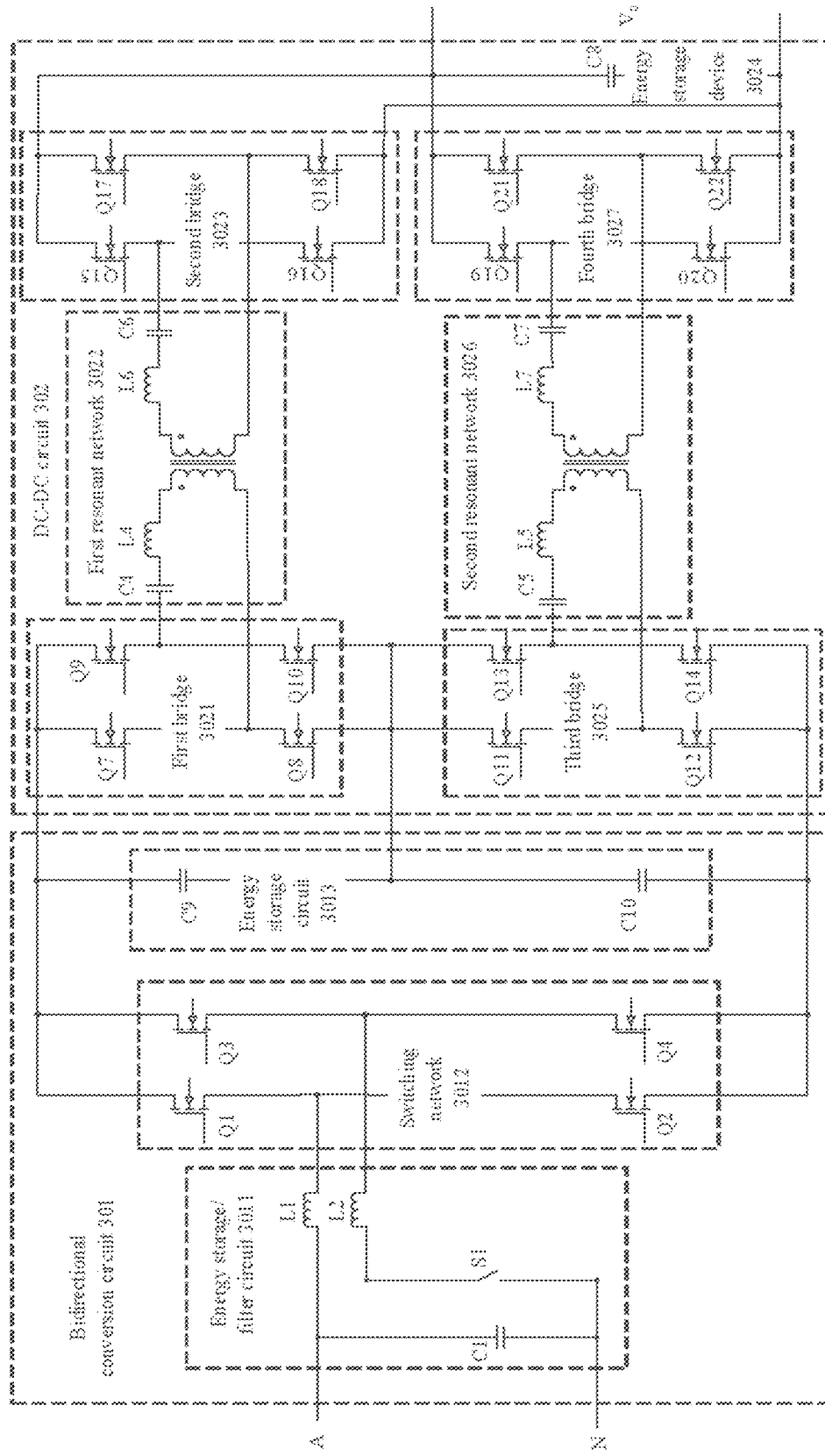
FIG. 10 is a schematic diagram of a specific structure of another bidirectional energy transmission circuit according to an embodiment of this application.

Optionally, as shown in FIG. 10, the controller 303 controlling the energy storage/filter circuit 3011 and the switching network 3012 to be in the third state st3 specifically includes:

The controller 303 controls the switching transistor S1 in the energy storage/filter circuit 3011 to be turned on and the switching transistor S2 in the energy storage/filter circuit 3011 to be turned off, controls the switching transistor S3, the switching transistor S4, and the switching transistor S5 in the switching network 3012 to be all turned off and the MOS transistor Q5 and the MOS transistor Q6 in the switching network 3012 to be open-circuited, and controls the MOS transistor Q1, the MOS transistor Q2, the MOS transistor Q3, the MOS transistor Q4, the switching transistor S3, and the switching transistor SS4 in the switching network to be separately turned off and on according to a corresponding fifth preset rule, so as to implement:

The energy storage/filter circuit 3011 performs energy storage on a single-phase alternating current voltage that is input from the first port 3011*a* of the energy storage/filter circuit 3011, and outputs a direct current voltage from the second port 3011*b* of the energy storage/filter circuit 3011. The switching network 3012 performs power conversion on a direct current voltage that is input from the first port 3012*a* of the switching network 3012, and outputs a converted direct current voltage from the second port 3012*b* of the switching network 3012. The energy storage network 3013 performs energy storage on a direct current voltage that is input from the first port 3013*a* of the energy storage network 3013, and outputs a second direct current voltage from the second port 3013*b* of the energy storage network 3013.

In addition, the controller 303 controlling the first bridge 3021, the second bridge 3023, the third bridge 3025, and the fourth bridge 3027 to be in the second state st2 specifically includes:

The controller 303 controls the MOS transistors in the first bridge 3021, the second bridge 3023, the third bridge 3025, and the fourth bridge 3027 to be turned off and on according to the seventh preset rule, so as to implement:

The first bridge 3021 and the third bridge 3025 each are configured to perform power conversion on the direct current voltage that is input from the first port of the corresponding bridge, and output the converted direct current voltage from the second port of the corresponding bridge. The first resonant network 3022 and the second resonant network 3026 are configured to perform power conversion on the input direct current voltage and output the converted direct current voltage. The second bridge 3023 and the fourth bridge 3027 each are configured to rectify the direct current voltage that is input from the first port of the corresponding bridge, and output the rectified direct current voltage from the second port of the corresponding bridge.

Figure 7:
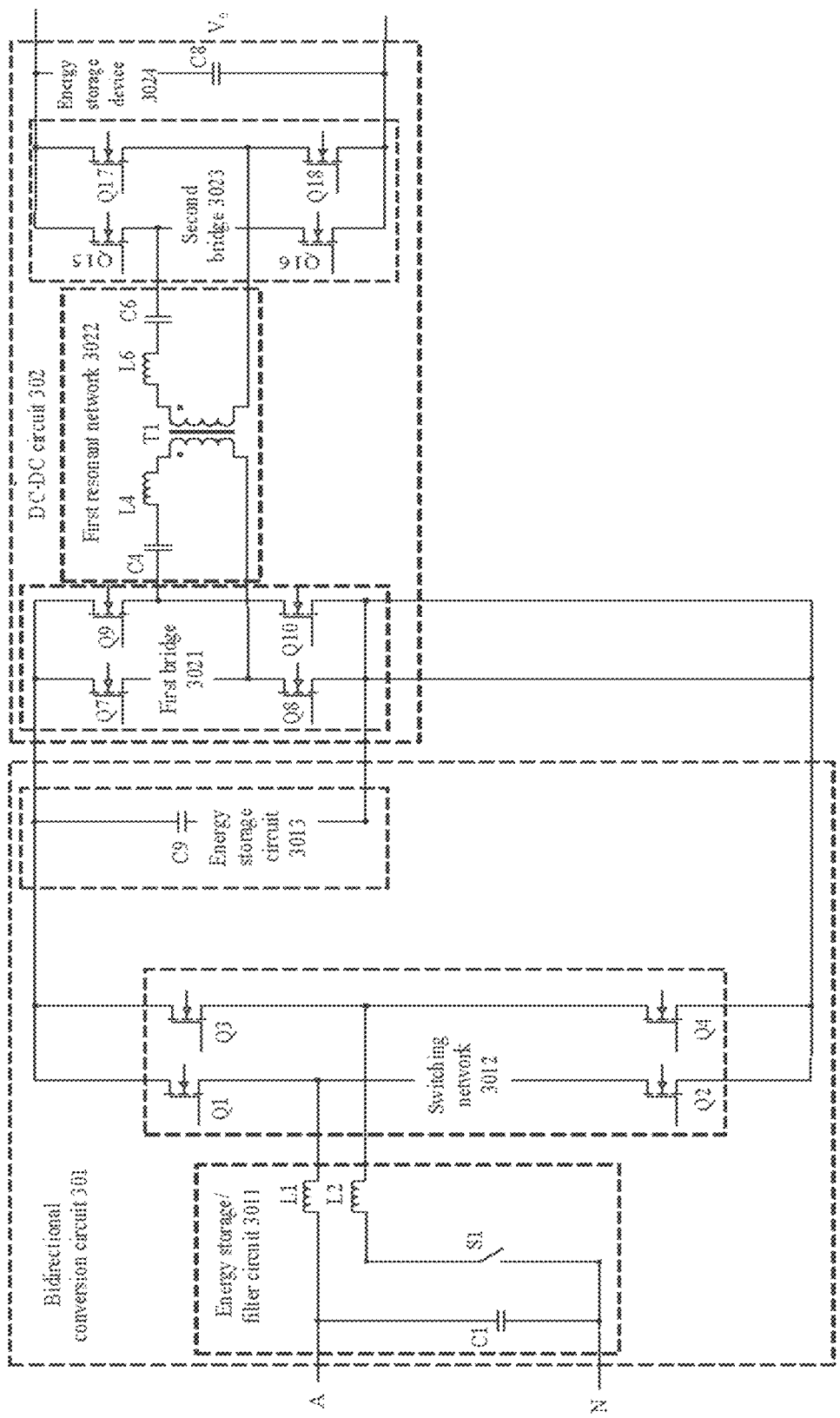
FIG. 7 is a schematic diagram of a specific structure of another bidirectional energy transmission circuit according to an embodiment of this application.

4. Direct current voltage to single-phase alternating current voltage:

Optionally, the controller controlling the first bridge 3021, the second bridge 3023, the third bridge 3025, and the fourth bridge 3027 to be in the fourth state st4 specifically includes:

As shown in FIG. 7, the controller controls the MOS transistors in the third bridge 3025 to be all short-circuited and the MOS transistors in the fourth bridge 3027 to be all open-circuited, and controls the MOS transistors in the first bridge 3021 and the second bridge 3023 to be turned off and on according to a tenth preset rule, so as to implement:

The second bridge 3023 is configured to perform power conversion on the direct current voltage that is input from the second port 3023*b* of the bridge 3023, and output the converted direct current voltage from the first port 3023*a* of the bridge 3023. The first resonant network 3022 is configured to perform power conversion on the input direct current voltage, and output the converted direct current voltage. The first bridge 3021 is configured to rectify the direct current voltage that is input from the second port 3021*b* of the bridge 3021, and output the rectified direct current voltage from the first port 3021*a* of the bridge 3021.

Figure 9:
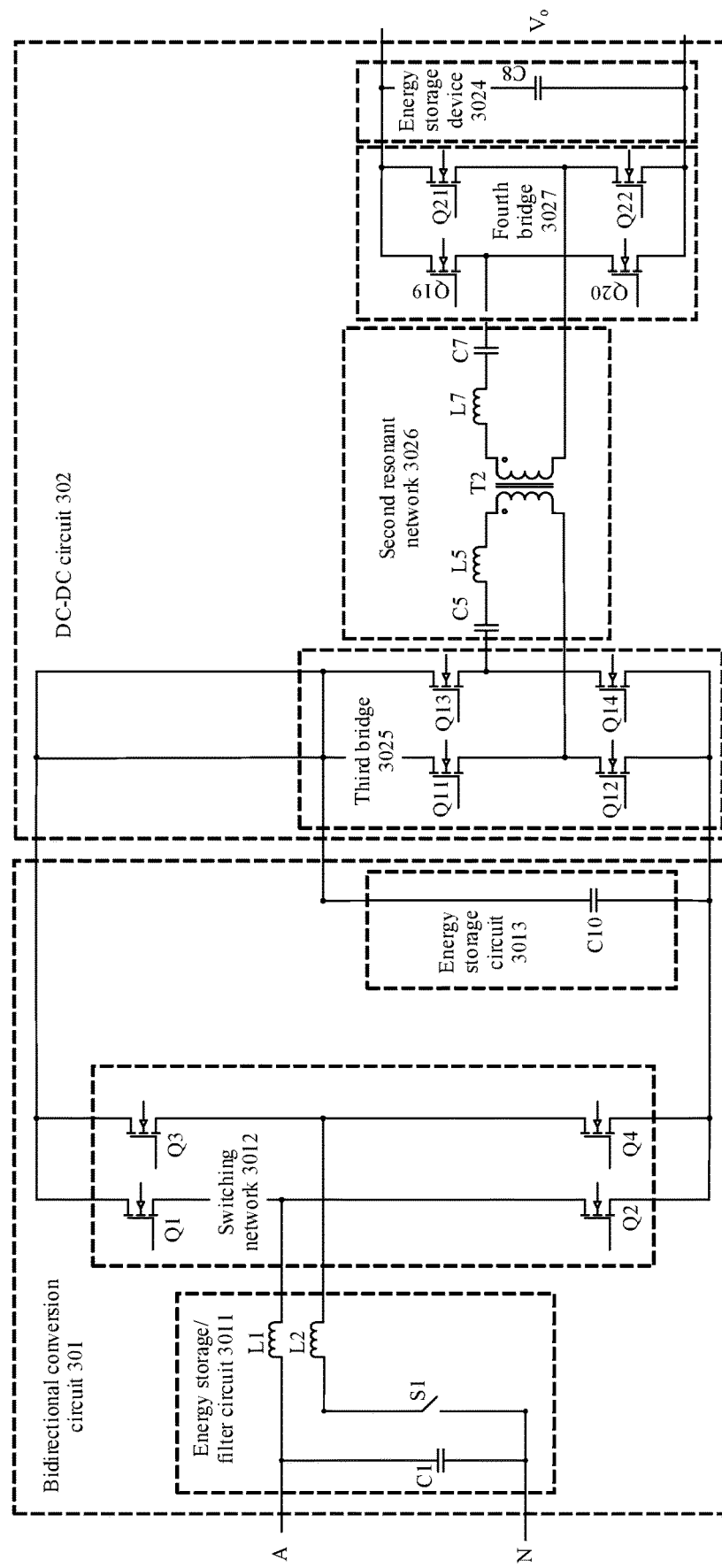
FIG. 9 is a schematic diagram of a specific structure of another bidirectional energy transmission circuit according to an embodiment of this application.

Alternatively, as shown in FIG. 9, the controller 303 controls the MOS transistors in the first bridge 3021 to be all short-circuited and the MOS transistors in the second bridge 3023 to be all open-circuited, and controls the MOS transistors in the third bridge 3025 and the fourth bridge 3027 to be turned off and on according to a twelfth preset rule, so as to implement:

The fourth bridge 3027 is configured to perform power conversion on the direct current voltage that is input from the second port 3027*b* of the bridge 3027, and output the converted direct current voltage from the first port 3027*a* of the bridge 3027. The second resonant network 3026 is configured to perform power conversion on the input direct current voltage, and output the converted direct current voltage. The third bridge 3025 is configured to rectify the direct current voltage that is input from the second port 3025*b* of the bridge 3025, and output the rectified direct current voltage from the first port 3025*a* of the bridge 3025.

As shown in FIG. 7, the controller 303 controlling the energy storage/filter circuit 3011 and the switching network 3012 to be in the sixth state st6 specifically includes:

The controller 303 controls the switching transistor S1 in the energy storage/filter circuit 3011 to be turned on and the switching transistor S2 in the energy storage/filter circuit 3011 to be turned off, controls the switching transistor S3, the switching transistor S4, and the switching transistor S5 in the switching network to be all turned off and the MOS transistor Q5 and the MOS transistor Q6 in the switching network to be open-circuited, and controls the MOS transistor Q1, the MOS transistor Q2, the MOS transistor Q3, the MOS transistor Q4, the switching transistor S3, and the switching transistor SS4 in the switching network to be separately turned off and on according to a corresponding fourth preset rule, so as to implement:

The energy storage network 3013 performs energy storage on the direct current voltage that is input from the second port 3013*b* of the energy storage network 3013, and outputs the direct current voltage from the first port 3013*a* of the energy storage network 3013. The switching network 3012 performs power conversion on the direct current voltage that is input from the second port 3012*b* of the switching network 3012, and outputs the converted direct current voltage from the first port 3012*a* of the switching network 3012. The energy storage/filter circuit 3011 filters the voltage that is input from the second port 3011*b* of the energy storage/filter circuit 3011, and outputs the single-phase alternating current voltage from the first port 3011*a* of the energy storage/filter circuit 3011.

Optionally, as shown in FIG. 10, the controller 303 controlling the first bridge 3021, the second bridge 3023, the third bridge 3025, and the fourth bridge 3027 to be in the fourth state st4 specifically includes:

The controller 303 controls the MOS transistors in the first bridge 3021, the second bridge 3023, the third bridge 3025, and the fourth bridge 3027 to be turned off and on according to the eighth preset rule, so as to implement:

The second bridge 3023 and the fourth bridge 3027 each are configured to perform power conversion on the direct current voltage that is input from the second port of the corresponding bridge, and output the converted direct current voltage from the first port of the corresponding bridge. The first resonant network 3022 and the second resonant network 3026 are configured to perform power conversion on the input direct current voltage and output the converted direct current voltage. The first bridge 3021 and the third bridge 3025 each are configured to rectify the direct current voltage that is input from the second port of the corresponding bridge, and output the rectified direct current voltage from the first port of the corresponding bridge.

In addition, the controller 303 controlling the energy storage/filter circuit 3011 and the switching network to be in the sixth state st6 specifically includes:

The controller 303 controls the switching transistor S1 in the energy storage/filter circuit 3011 to be turned on and the switching transistor S2 in the energy storage/filter circuit 3011 to be turned off, controls the switching transistor S3, the switching transistor S4, and the switching transistor S5 in the switching network to be all turned off and the MOS transistor Q5 and the MOS transistor Q6 in the switching network to be open-circuited, and controls the MOS transistor Q1, the MOS transistor Q2, the MOS transistor Q3, the MOS transistor Q4, the switching transistor S3, and the switching transistor SS4 in the switching network to be separately turned off and on according to a corresponding fourth preset rule, so as to implement:

The energy storage network 3013 performs energy storage on the direct current voltage that is input from the second port 3013*b* of the energy storage network 3013, and outputs the direct current voltage from the first port 3013*a* of the energy storage network 3013. The switching network 3012 performs power conversion on the direct current voltage that is input from the second port 3012*b* of the switching network 3012, and outputs the converted direct current voltage from the first port 3012*a* of the switching network 3012. The energy storage/filter circuit 3011 filters the voltage that is input from the second port 3011*b* of the energy storage/filter circuit 3011, and outputs the single-phase alternating current voltage from the first port 3011*a* of the energy storage/filter circuit 3011.

Figure 11:
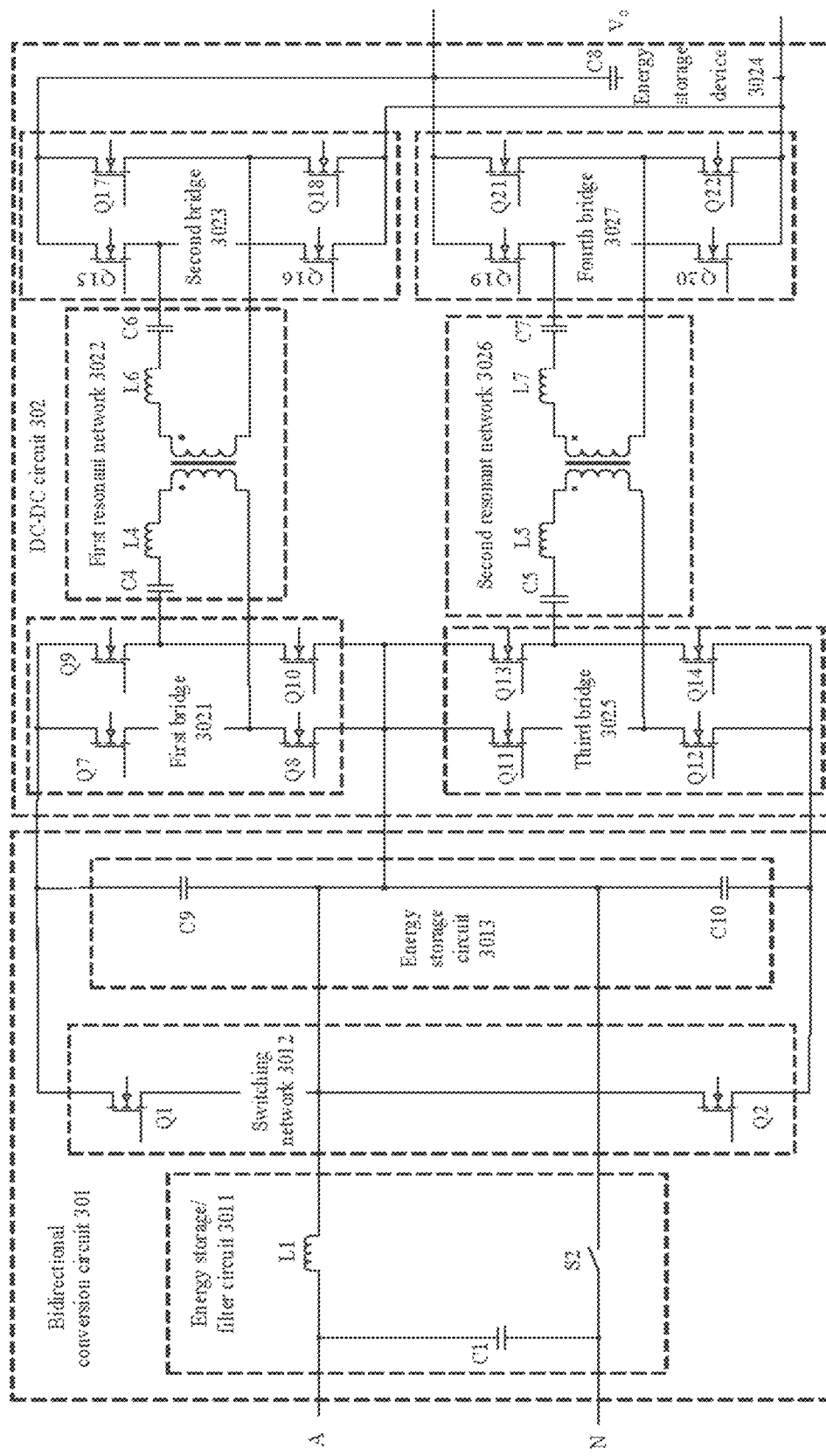
FIG. 11 is a schematic diagram of a specific structure of another bidirectional energy transmission circuit according to an embodiment of this application.

Alternatively, as shown in FIG. 11, the controller 303 controls the switching transistor S1 in the energy storage/filter circuit 3011 to be turned off and the switching transistor S2 in the energy storage/filter circuit 3011 to be turned on, controls the switching transistor S3, the switching transistor S4, and the switching transistor S5 in the switching network 3012 to be all turned off and the MOS transistor Q3, the MOS transistor Q4, the MOS transistor Q5, and the MOS transistor Q6 in the switching network 3012 to be all open-circuited, and controls the MOS transistor Q1 and the MOS transistor Q2 in the switching network 3012 to be separately turned off and on according to a corresponding sixth preset rule, so as to implement:

The energy storage network 3013 performs energy storage on the direct current voltage that is input from the second port 3013*b* of the energy storage network 3013, and outputs the direct current voltage from the first port 3013*a* of the energy storage network 3013. The switching network 3012 performs power conversion on the direct current voltage that is input from the second port 3012*b* of the switching network 3012, and outputs the converted direct current voltage from the first port 3012*a* of the switching network 3012. The energy storage/filter circuit 3011 filters the voltage that is input from the second port 3011*b* of the energy storage/filter circuit 3011, and outputs the single-phase alternating current voltage from the first port 3011*a* of the energy storage/filter circuit 3011.

It should be noted herein that, that the three-phase or single-phase alternating current voltage is input or output from the first port 301*a* of the bidirectional conversion circuit 301 specifically means that the three-phase or single-phase alternating current voltage is input or output from the first port 3011*a* of the energy storage/filter circuit 3011. That the direct current voltage is input or output from the second port 301*b* of the bidirectional conversion circuit 301 specifically means that the direct current voltage is input or output from the second port 3013b of the energy storage circuit 3013.

It should be noted herein that, when the single-phase alternating current voltage is converted into the direct current voltage, the bidirectional conversion circuit 301 may be referred to as a PFC circuit; and when the direct current voltage is converted into the single-phase alternating current voltage, the bidirectional conversion circuit 301 may be referred to as an inverter circuit.

In other words, when the single-phase alternating current voltage is converted into the direct current voltage, in the bidirectional conversion circuit 301, the controller 303 controls the switching transistor S1 to be turned on, the switching transistor S2 and the switching transistor S5 to be turned off, and the MOS transistor Q5 and the MOS transistor Q6 to be open-circuited, and in addition, other components normally work; and in the DC-DC circuit 302, the controller 303 controls the MOS transistor Q11, the MOS transistor Q12, the MOS transistor Q13, and the MOS transistor Q14 to be all short-circuited and the MOS transistor Q19, the MOS transistor Q20, the MOS transistor Q21, and the MOS transistor Q22 to be all open-circuited, and in addition, other components all normally work, as shown in FIG. 6.

When the direct current voltage is converted into the single-phase alternating current voltage, in the bidirectional conversion circuit 301, the controller 303 controls the switching transistor S1 to be turned on, the switching transistor S2, the switching transistor S3, the switching transistor S4, and the switching transistor S5 to be all turned off, and the MOS transistor Q5 and the MOS transistor Q6 to be open-circuited, and in addition, other components normally work; and in the DC-DC circuit 302, the controller 303 controls the MOS transistor Q11, the MOS transistor Q12, the MOS transistor Q13, and the MOS transistor Q14 to be all short-circuited and the MOS transistor Q19, the MOS transistor Q20, the MOS transistor Q21, and the MOS transistor Q22 to be all open-circuited, and in addition, other components all normally work, as shown in FIG. 7.

When energy flows forward (that is, the single-phase alternating current voltage is converted into the direct current voltage), as shown in FIG. 6, the single-phase alternating current voltage is input from the A-phase port and the N-phase port of the bidirectional conversion circuit 301, and the direct current voltage is output from the second port Vo of the DC-DC circuit 302. The switching transistor S1 is closed, the switching transistor S2 is turned off, the switching transistor S5 is turned off, and the MOS transistor Q5 and the MOS transistor Q6 are open-circuited. The inductor L1, the inductor L2, the MOS transistor Q1, the MOS transistor Q2, the MOS transistor Q3, the MOS transistor Q4, the switching transistor S3, the switching transistor S4, and the capacitor C9 together form a new bidirectional conversion circuit 301. In this case, the circuit may be considered as a bridgeless PFC circuit, configured to convert the single-phase alternating current voltage into the direct current voltage. The MOS transistor Q11, the MOS transistor Q12, the MOS transistor Q13, and the MOS transistor Q14 are short-circuited, and the MOS transistor Q19, the MOS transistor Q20, the MOS transistor Q21, and the MOS transistor Q22 are open-circuited. That is, the capacitor C2, the capacitor C3, the capacitor C10, the inductor L3, the MOS transistor Q5, the MOS transistor Q6, the MOS transistor Q11, and the MOS transistor Q12 are open-circuited, the MOS transistor Q13, the MOS transistor Q14, the MOS transistor Q19, the capacitor C5, the inductor L5, the transformer T2, the inductor L7, the capacitor C7, the MOS transistor Q20, the MOS transistor Q21, and the MOS transistor Q22 do not work. The MOS transistor Q7, the MOS transistor Q8, the MOS transistor Q9, the MOS transistor Q10, the capacitor C4, the inductor L4, the inductor T1, the inductor L6, the capacitor C6, the MOS transistor Q15, the MOS transistor Q16, the MOS transistor Q17, the MOS transistor Q18, and the capacitor C8 together form a new DC-DC circuit.

When energy reversely flows (that is, the direct current voltage is converted into the single-phase alternating current voltage), as shown in FIG. 7, the direct current voltage is input from the second port Vo of the DC-DC circuit 302, and the single-phase alternating current voltage is output from the A-phase port and the N-phase port of the bidirectional conversion circuit 301. The switching transistor S1 is closed, and the switching transistors S2 and S5 are turned off. The MOS transistor Q7, the MOS transistor Q8, the MOS transistor Q9, the MOS transistor Q10, the capacitor C4, the inductor L4, the transformer T1, the inductor L6, the capacitor C6, the MOS transistor Q15, the MOS transistor Q16, the MOS transistor Q17, the MOS transistor Q18, and the capacitor C8 together form a new DC-DC circuit. The MOS transistor Q11, the MOS transistor Q12, the MOS transistor Q13, and the MOS transistor Q14 are short-circuited, and the MOS transistor Q19, the MOS transistor Q20, the MOS transistor Q21, and the MOS transistor Q22 are open-circuited. That is, the MOS transistor Q11, the MOS transistor Q12, the MOS transistor Q13, the MOS transistor Q14, the capacitor C5, the inductor L5, the transformer T2, the inductor L7, the capacitor C7, the MOS transistor Q19, the MOS transistor Q20, the MOS transistor Q21, and the MOS transistor Q22 do not work. The inductor L3, the MOS transistor Q5, and the MOS transistor Q6 are open-circuited, and the inductor L1, the inductor L2, the MOS transistor Q1, the MOS transistor Q2, the MOS transistor Q3, the MOS transistor Q4, the switching transistor S3, the switching transistor S4, and the capacitor C9 together form a new bidirectional conversion circuit. In this case, the circuit may be considered as an inverter circuit, configured to convert the direct current voltage into the single-phase alternating current voltage.

In this case, the first port 301a of the bidirectional conversion circuit 301 includes the A-phase port and the N-phase port. The second port 302b includes the first end part and the second end part of the capacitor C9 and the source of the MOS transistor Q4. The first port 302a of the DC-DC circuit 302 includes the drain of the MOS transistor Q7 and the source of the MOS transistor Q8. The second port 302b includes the first end part and the second end part of the capacitor C8.

Optionally, specific circuits shown in FIG. 8 and FIG. 9 may be further used to implement bidirectional conversion of the single-phase alternating current voltage to the direct current voltage. For a specific connection relationship of the circuits shown in FIG. 8 and FIG. 9, refer to specific descriptions in FIG. 6 and FIG. 7. Details are not described herein again.

Specifically, in the bidirectional conversion circuit 301, the controller 303 controls the switching transistor S1 to be turned on, the switching transistor S2 and the switching transistor S5 to be turned off, and the MOS transistor Q5 and the MOS transistor Q6 to be open-circuited, and in addition, other components normally work. In the DC-DC circuit 302, the controller 303 controls the MOS transistor Q7, the MOS transistor Q8, the MOS transistor Q9, and the MOS transistor Q10 to be all short-circuited and the MOS transistor Q15, the MOS transistor Q16, the MOS transistor Q17, and the MOS transistor Q18 to be all open-circuited, and in addition, other components all normally work, as shown in FIG. 8.

In the bidirectional conversion circuit 301, the controller 303 controls the switching transistor S1 to be turned on, the switching transistor S2, the switching transistor S3, the switching transistor S4, and the switching transistor S5 to be all turned off, and the MOS transistor Q5 and the MOS transistor Q6 to be open-circuited, and in addition, other components normally work. In the DC-DC circuit 302, the controller 303 controls the MOS transistor Q7, the MOS transistor Q8, the MOS transistor Q9, and the MOS transistor Q10 to be all short-circuited and the MOS transistor Q15, the MOS transistor Q16, the MOS transistor Q17, and the MOS transistor Q18 to be all open-circuited, and in addition, other components all normally work, as shown in FIG. 9.

When energy flows forward (that is, the single-phase alternating current voltage is converted into the direct current voltage), as shown in FIG. 8, the single-phase alternating current voltage is input from the A-phase port and the N-phase port of the bidirectional conversion circuit 301, and the direct current voltage is output from the second port Vo of the DC-DC circuit 302. The switching transistor S1 is closed, the switching transistor S2 and the switching transistor S5 are turned off, and the MOS transistor Q5 and the MOS transistor Q6 are open-circuited. The inductor L1, the inductor L2, the MOS transistor Q1, the MOS transistor Q2, the MOS transistor Q3, the MOS transistor Q4, the switching transistor S3, the switching transistor S4, and the capacitor C10 form a new bidirectional conversion circuit. The circuit may be considered as a PFC circuit, and is configured to convert the single-phase alternating current voltage into the direct current voltage. The MOS transistor Q7, the MOS transistor Q8, the MOS transistor Q9, and the MOS transistor Q10 are short-circuited, and the MOS transistor Q15, the MOS transistor Q16, the MOS transistor Q17, and the MOS transistor Q18 are open-circuited. That is, the MOS transistor Q7, the MOS transistor Q8, the MOS transistor Q9, the MOS transistor Q10, the capacitor C4, the inductor L4, the transformer T1, the inductor L6, the capacitor C6, the MOS transistor Q15, the MOS transistor Q16, the MOS transistor Q17, and the MOS transistor Q18 do not work. The MOS transistor Q11, the MOS transistor Q12, the MOS transistor Q13, the MOS transistor Q14, the capacitor C5, the inductor L5, the inductor T2, the inductor L7, the capacitor C7, the MOS transistor Q19, the MOS transistor Q20, the MOS transistor Q21, the MOS transistor Q22, and the capacitor C8 together form a new DC-DC circuit.

When energy reversely flows (that is, the direct current voltage is converted into the single-phase alternating current voltage), as shown in FIG. 9, the direct current voltage is input from the second port Vo of the DC-DC circuit 302, and the single-phase alternating current voltage is output from the A-phase port and the N-phase port of the bidirectional conversion circuit 301. The switching transistor S1 is closed, and the switching transistors S2 and S5 are turned off. The MOS transistor Q11, the MOS transistor Q12, the MOS transistor Q13, the MOS transistor Q14, the capacitor C5, the inductor L5, the inductor T2, the inductor L7, the capacitor C7, the MOS transistor Q19, the MOS transistor Q20, the MOS transistor Q21, the MOS transistor Q22, and the capacitor C8 together form a new DC-DC circuit. The MOS transistor Q7, the MOS transistor Q8, the MOS transistor Q9, and the MOS transistor Q10 are short-circuited, and the MOS transistor Q15, the MOS transistor Q16, the MOS transistor Q17, and the MOS transistor Q18 are all open-circuited. That is, the MOS transistor Q7, the MOS transistor Q8, the MOS transistor Q9, the MOS transistor Q10, the capacitor C4, the inductor L4, the transformer T1, the inductor L6, the capacitor C6, the MOS transistor Q15, the MOS transistor Q16, the MOS transistor Q17, and the MOS transistor Q18 do not work. The capacitor C2, the capacitor C3, the capacitor C9, the inductor L3, the MOS transistor Q5, and the MOS transistor Q6 are open-circuited. The inductor L1, the inductor L2, the MOS transistor Q1, the MOS transistor Q2, the MOS transistor Q3, the MOS transistor Q4, the switching transistor S3, the switching transistor S4, and the capacitor C10 together form a new bidirectional conversion circuit. In this case, the circuit may be considered as an inverter circuit, configured to convert the direct current voltage into the single-phase alternating current voltage.

In this case, the first port 301a of the bidirectional conversion circuit 301 includes the A-phase port and the N-phase port. The second port 301b includes the first end part and the second end part of the capacitor C10 and the drain of the MOS transistor Q3. The first port 302a of the DC-DC circuit 302 includes the drain of the MOS transistor Q11 and the source of the MOS transistor Q13. The second port 302b includes the first end part and the second end part of the capacitor C8.

The bidirectional energy transmission circuit configured to implement bidirectional conversion of the single-phase alternating current voltage to the direct current voltage may further have another circuit structure. As shown in FIG. 10. The circuit shown in FIG. 10 is obtained when some components in the circuit shown in FIG. 5a are in a non-working state. Specifically, as shown in FIG. 10, except that the switching transistor S1 in the bidirectional conversion circuit 301 is turned on, the switching transistor S2, the switching transistor S3, the switching transistor S4, and the switching transistor S5 are all turned off, and the capacitor C2, the capacitor C3, the inductor L3, the MOS transistor Q5, and the MOS transistor Q6 are all open-circuited, other components in the bidirectional energy transmission circuit are all in a normal working state.

As shown in FIG. 10, when energy flows forward (that is, the single-phase alternating current voltage is converted into the direct current voltage), the single-phase alternating current voltage is input from the A-phase port and the N-phase port of the bidirectional conversion circuit 301, and the direct current voltage is output from the second port Vo of the DC-DC circuit 302. When energy reversely flows (that is, the direct current voltage is converted into the single-phase alternating current voltage), the direct current voltage is input from the second port Vo of the DC-DC circuit, and the single-phase alternating current voltage is output from the A-phase port and the N-phase port of the bidirectional conversion circuit 301. The switching transistor S1 is closed, the switching transistors S2, S3, S4, and S5 are turned off, and the MOS transistor Q5 and the MOS transistor Q6 are open-circuited. The inductor L1 is open-circuited, and the inductor L2, the MOS transistor Q1, the MOS transistor Q2, the MOS transistor Q3, the MOS transistor Q4, the capacitor C9, and the capacitor C10 together form a bidirectional conversion circuit. When the bidirectional conversion circuit is configured to convert the single-phase alternating current voltage into the direct current voltage, the bidirectional conversion circuit may be considered as a PFC circuit. When the bidirectional conversion circuit is configured to convert the direct current voltage into the single-phase alternating current voltage, the bidirectional conversion circuit may be considered as an inverter circuit.

The MOS transistor Q7, the MOS transistor Q8, the MOS transistor Q9, the MOS transistor Q10, the capacitor C4, the inductor L4, the transformer T1, the inductor L6, the capacitor C6, the MOS transistor Q15, the MOS transistor Q16, the MOS transistor Q17, the MOS transistor Q18, the MOS transistor Q11, the MOS transistor Q12, the MOS transistor Q13, the MOS transistor Q14, the capacitor C5, the inductor L5, the transformer T2, the inductor L7, the capacitor C7, the MOS transistor Q19, the MOS transistor Q20, the MOS transistor Q21, the MOS transistor Q22, and the capacitor C8 together form the DC-DC circuit 302.

The new bidirectional conversion circuit and the new DC-DC circuit can implement rectification on the single-phase alternating current voltage, and can also implement inversion on the direct current voltage.

In this case, the first port 301a of the bidirectional conversion circuit 301 includes the A-phase port and the N-phase port. The second port 301b includes the first end part and the second end part of the capacitor C9 and the second end part of the capacitor C10. The first port 302a of the DC-DC circuit 302 includes the drain of the MOS transistor Q7 and the source of the MOS transistor Q13. The second port 302b includes the first end part and the second end part of the capacitor C8.

It should be noted herein that the DC-DC circuit in the circuit shown in FIG. 10 and the DC-DC circuit in the circuit shown in FIG. 6 to FIG. 9 each have two additional full-bridge circuits and one additional CLLC circuit, so that a voltage adjustment range of the DC-DC circuit in the circuit shown in FIG. 10 is greater than a voltage adjustment range of the DC-DC circuit in the circuit shown in FIG. 6 to FIG. 9.

In a feasible embodiment, when the direct current voltage is converted into the single-phase alternating current voltage, the bidirectional conversion circuit 301 in the bidirectional energy transmission circuit may alternatively be of another circuit structure, as shown in FIG. 11.

The circuit shown in FIG. 11 is obtained when some components in the circuit shown in FIG. 5a are in a non-working state. Specifically, as shown in FIG. 11, in the bidirectional conversion circuit 301, the controller 303 controls the switching transistor S2 to be turned on, the switching transistor S1, the switching transistor S3, the switching transistor S4, and the switching transistor S5 to be turned off, and the MOS transistor Q3, the MOS transistor Q4, the MOS transistor Q5, and the MOS transistor Q6 to be open-circuited, and in addition, other components in the bidirectional energy transmission circuit 300 are all in a normal working state.

When energy reversely flows (that is, the direct current voltage is converted into the single-phase alternating current voltage), as shown in FIG. 11, the direct current voltage is input from the second port Vo of the DC-DC circuit 302, and the single-phase alternating current voltage is output from the A-phase port and the N-phase port of the bidirectional conversion circuit 301. The MOS transistor Q7, the MOS transistor Q8, the MOS transistor Q9, the MOS transistor Q10, the capacitor C4, the inductor L4, the transformer T1, the inductor L6, the capacitor C6, the MOS transistor Q15, the MOS transistor Q16, the MOS transistor Q17, the MOS transistor Q18, the MOS transistor Q11, the MOS transistor Q12, the MOS transistor Q13, the MOS transistor Q14, the capacitor C5, the inductor L5, the transformer T2, the inductor L7, the capacitor C7, the MOS transistor Q19, the MOS transistor Q20, the MOS transistor Q21, the MOS transistor Q22, and the capacitor C8 together form a DC-DC circuit. The switching transistor S2 is turned on, the switching transistor S1, the switching transistor S3, the switching transistor S4, and the switching transistor S5 are turned off, and the MOS transistor Q3, the MOS transistor Q4, the MOS transistor Q5, and the MOS transistor Q6 are open-circuited. The capacitor C1, the inductor L2, the MOS transistor Q1, the MOS transistor Q2, the capacitor C9, and the capacitor C10 together form a new bidirectional conversion circuit. In this case, the circuit may be considered as an inverter circuit, configured to convert the direct current voltage into the single-phase alternating current voltage.

In this case, the first port 301a of the bidirectional conversion circuit 301 includes the A-phase port and the N-phase port. The second port 301b includes the first end part of the capacitor C9 and the first end part and the second end part of the capacitor C10. The first port 302a of the DC-DC circuit 302 includes the drain of the MOS transistor Q7, the source of the MOS transistor Q8, and the source of the MOS transistor Q13. The second port 302b includes the first end part and the second end part of the capacitor C8.

It should be noted that, when reverse flow of energy is implemented, in addition to the switch and the inductor, the circuit shown in FIG. 10 differs from the circuit shown in FIG. 11 in that the circuit shown in FIG. 10 has two more MOS transistors than the circuit shown in FIG. 11, so that output power of the circuit shown in FIG. 10 is higher than output power of the circuit shown in FIG. 11.

It should be noted herein that, in the circuits shown in FIG. 5a and FIG. 6 to FIG. 11, for ease of drawing, the gate of each MOS transistor is suspended. However, in an actual application process, the gate of each MOS transistor is connected to the controller, and the controller inputs a signal to the gate based on a conduction policy, so that the MOS transistor is conducted according to a specific policy, thereby implementing rectification and inversion.

It can be learned that this application provides the bidirectional energy transmission apparatus. When energy flows forward, conduction policies of different switching devices are controlled, to implement rectification of a three-phase alternating current, or implement rectification of a single-phase alternating current. When energy reversely flows, inversion from a direct current to a three-phase alternating current can be implemented, or inversion from a direct current to a single-phase alternating current can be implemented. Therefore, configuration is flexible, and a high-power charging function is implemented.

In a feasible embodiment, an embodiment of this application further provides an on-board charger. The on-board charger includes the bidirectional energy transmission apparatus disclosed in this embodiment of this application.

In a feasible embodiment, an embodiment of this application further provides an electric vehicle. The electric vehicle includes a control system and an energy system. The energy system includes the bidirectional energy transmission apparatus shown in any one of FIG. 5a and FIG. 6 to FIG. 11, or the foregoing on-board charger.

The embodiments of this application are described in detail above. The principle and implementation of this application are described in this specification by using specific examples. The descriptions about the embodiments are merely provided to help understand the method and core ideas of this application. In addition, a person of ordinary skill in the art can make variations to this application in terms of the specific implementations and application scopes according to the ideas of this application. Therefore, the content of this specification shall not be construed as a limitation to this application.

What is claimed is:

1. A bidirectional energy transmission apparatus, comprising a controller and a bidirectional energy transmission circuit, wherein a control terminal of the controller is connected to a controlled terminal of the bidirectional energy transmission circuit, wherein the bidirectional energy transmission circuit comprises a bidirectional conversion circuit and a direct current-direct current (DC-DC) circuit, a second port of the bidirectional conversion circuit is connected to a first port of the DC-DC circuit, and the controlled terminal of the bidirectional energy transmission circuit comprises a controlled terminal of the bidirectional conversion circuit and a controlled terminal of the DC-DC circuit, and wherein:
the controller is configured to control the bidirectional energy transmission circuit to be in a rectification working state to:
convert, into a first direct current voltage, a three-phase or single-phase alternating current voltage that is input from a first port of the bidirectional energy transmission circuit; and
output the first direct current voltage from a second port of the bidirectional energy transmission circuit; or
the controller is configured to control the bidirectional energy transmission circuit to be in an inversion working state to:
convert, into a three-phase or single-phase alternating current voltage, a first direct current voltage that is input from a second port of the bidirectional energy transmission circuit; and
output the three-phase or single-phase alternating current voltage from a first port of the bidirectional energy transmission circuit.

2. The bidirectional energy transmission apparatus according to claim 1, wherein:
the rectification working state comprises a first rectification working state and a second rectification working state; and
the controller is configured to control the bidirectional energy transmission circuit to be in the rectification working state comprises:
the controller is configured to:
when it is detected that the three-phase alternating current voltage is input from the first port of the bidirectional energy transmission circuit, control the bidirectional energy transmission circuit to be in the first rectification working state to:
convert the three-phase alternating current voltage into the first direct current voltage; and
output the first direct current voltage from the second port of the bidirectional energy transmission circuit; or
when it is detected that the single-phase alternating current voltage is input from the first port of the bidirectional energy transmission circuit, control the bidirectional energy transmission circuit to be in the first rectification working state to:
convert the single-phase alternating current voltage into the first direct current voltage; and
output the first direct current voltage from the second port of the bidirectional energy transmission circuit.

3. The bidirectional energy transmission apparatus according to claim 1, wherein:
the inversion working state comprises a first inversion working state and a second inversion working state; and
the controller is configured to control the bidirectional energy transmission circuit to be in the inversion working state comprises:
the controller is configured to:
when it is detected that the three-phase alternating current voltage is output from the first port of the bidirectional energy transmission circuit, control the bidirectional energy transmission circuit to be in the first inversion working state to:
convert, into the three-phase alternating current voltage, the first direct current voltage that is input from the second port of the bidirectional energy transmission circuit; and
output the three-phase alternating current voltage from the first port of the bidirectional energy transmission circuit; or
when it is detected that the single-phase alternating current voltage is output from the first port of the bidirectional energy transmission circuit, control the bidirectional energy transmission circuit to be in the second inversion working state to:
convert, into the single-phase alternating current voltage, the first direct current voltage that is input from the second port of the bidirectional energy transmission circuit; and
output the single-phase alternating current voltage from the first port of the bidirectional energy transmission circuit.

4. The bidirectional energy transmission apparatus according to claim 2, wherein:
the controller controlling the bidirectional energy transmission circuit to be in a first rectification state comprises:
the controller controls the bidirectional conversion circuit to be in a first working state to:
convert, into a second direct current voltage, a three-phase alternating current voltage that is input from a first port of the bidirectional conversion circuit; and
output the second direct current voltage from the second port of the bidirectional conversion circuit; and
the controller controls the DC-DC circuit to be in a second working state to:
convert, into a first direct current voltage, a second direct current voltage that is input from the first port of the DC-DC circuit; and
output the first direct current voltage from a second port of the DC-DC circuit; or
the controller controlling the bidirectional energy transmission circuit to be in a second rectification state comprises:
the controller controls the bidirectional conversion circuit to be in a third working state to:
convert, into a second direct current voltage, a single-phase alternating current voltage that is input from a first port of the bidirectional conversion circuit; and
output the second direct current voltage from the second port of the bidirectional conversion circuit; and
the controller controls the DC-DC circuit to be in a second working state to:
convert, into a first direct current voltage, a second direct current voltage that is input from the first port of the DC-DC circuit; and output the first direct current voltage from a second port of the DC-DC circuit, wherein the first direct current voltage is the same as or different from the second direct current voltage.

5. The bidirectional energy transmission apparatus according to claim 4, wherein:
the controller controlling the bidirectional energy transmission circuit to be in a first inversion state comprises:
the controller controls the DC-DC circuit to be in a fourth working state to:
convert, into a second direct current voltage, a first voltage that is input from the second port of the DC-DC circuit; and
output the second direct current voltage from the first port of the DC-DC circuit; and
the controller controls the bidirectional conversion circuit to be in a fifth working state to:
convert, into a three-phase alternating current voltage, a second direct current voltage that is input from the second port of the bidirectional conversion circuit; and
output the three-phase alternating current voltage from the first port of the bidirectional conversion circuit; or
the controller controlling the bidirectional energy transmission circuit to be in a second inversion state comprises:
the controller controls the DC-DC circuit to be in a fourth working state to:
convert, into a second direct current voltage, a first voltage that is input from the second port of the DC-DC circuit; and
output the second direct current voltage from the first port of the DC-DC circuit; and
the controller controls the bidirectional conversion circuit to be in a sixth working state to:
convert, into a single-phase alternating current voltage, a second direct current voltage that is input from the second port of the bidirectional conversion circuit; and
output the single-phase alternating current voltage from the first port of the bidirectional conversion circuit.

6. The bidirectional energy transmission apparatus according to claim 5, wherein the bidirectional conversion circuit comprises an energy storage/filter circuit, a switching network, and an energy storage circuit, wherein:
a first port of the energy storage/filter circuit is the first port of the bidirectional conversion circuit, a second port of the energy storage/filter circuit is connected to a first port of the switching network, a third port of the energy storage/filter circuit is connected to a first port of the energy storage circuit, a second port of the switching network is connected to the first port of the energy storage circuit, and a second port of the energy storage circuit is the second port of the bidirectional conversion circuit; and
the controlled terminal of the bidirectional conversion circuit comprises a controlled terminal of the energy storage/filter circuit and a controlled terminal of the switching network; and
the DC-DC circuit comprises a first bridge, a second bridge, a third bridge, a fourth bridge, a first resonant network, a second resonant network, and an energy storage device, wherein:
the first port of the DC-DC circuit comprises a first port of the first bridge and a first port of the third bridge, a second port of the first bridge is connected to a first port of the first resonant network, a second port of the first resonant network is connected to a first port of the second bridge, a second port of the third bridge is connected to a first port of the second resonant network, a second port of the second resonant network is connected to a first port of the fourth bridge, a second port of the second bridge and a second port of the fourth bridge are both connected to a first port of the energy storage device, and the second port of the DC-DC circuit is a second port of the energy storage device; and
the controlled terminal of the DC-DC circuit comprises a controlled terminal of the first bridge, a controlled terminal of the second bridge, a controlled terminal of the third bridge, and a controlled terminal of the fourth bridge.

7. The bidirectional energy transmission apparatus according to claim 6, wherein the controller controlling the bidirectional conversion circuit to be in the first working state comprises:
the controller controls the energy storage/filter circuit and the switching network to be in a first state st1 to implement:
the energy storage/filter circuit performs energy storage on a three-phase alternating current voltage that is input from the first port of the energy storage/filter circuit, and outputs a direct current voltage from the second port of the energy storage/filter circuit;
the switching network performs power conversion on a direct current voltage that is input from the first port of the switching network, and outputs a converted direct current voltage from the second port of the switching network; and
the energy storage circuit performs energy storage on a direct current voltage that is input from the first port of the energy storage network, and outputs the direct current voltage from the second port of the energy storage circuit.

8. The bidirectional energy transmission apparatus according to claim 6, wherein the controller controlling the bidirectional conversion circuit to be in the third working state comprises:
the controller controls the energy storage/filter circuit and the switching network to be in a third state st3 to implement:
the energy storage/filter circuit performs energy storage on a single-phase alternating current voltage that is input from the first port of the energy storage/filter circuit, and outputs a direct current voltage from the second port of the energy storage/filter circuit;
the switching network performs power conversion on a direct current voltage that is input from the first port of the switching network, and outputs a converted direct current voltage from the second port of the switching network; and
the energy storage network performs energy storage on a direct current voltage that is input from the first port of the energy storage network, and outputs the second direct current voltage from the second port of the energy storage circuit.

9. The bidirectional energy transmission apparatus according to claim 6, wherein the controller controlling the bidirectional conversion circuit to be in the fifth working state comprises:

the controller controls the energy storage/filter circuit and the switching network to be in a fifth state st5 to implement:
 the energy storage network performs energy storage on a direct current voltage that is input from the second port of the energy storage network, and outputs the direct current voltage from the first port of the energy storage circuit;
 the switching network performs power conversion on a direct current voltage that is input from the second port of the switching network, and outputs a converted direct current voltage from the first port of the switching network; and
 the energy storage/filter circuit filters a direct current voltage that is input from the second port of the energy storage/filter circuit, and outputs a three-phase alternating current voltage from the first port of the energy storage/filter circuit.

10. The bidirectional energy transmission apparatus according to claim 6, wherein the controller controlling the bidirectional conversion circuit to be in the sixth working state comprises:
 the controller controls the energy storage/filter circuit and the switching network to be in a sixth state st6 to implement:
  the energy storage network performs energy storage on a direct current voltage that is input from the second port of the energy storage network, and outputs the direct current voltage from the first port of the energy storage circuit;
  the switching network performs power conversion on a direct current voltage that is input from the second port of the switching network, and outputs a converted direct current voltage from the first port of the switching network; and
  the energy storage/filter circuit filters a direct current voltage that is input from the second port of the energy storage/filter circuit, and outputs a single-phase alternating current voltage from the first port of the energy storage/filter circuit.

11. The bidirectional energy transmission apparatus according to claim 6, wherein the controller controlling the DC-DC circuit to be in the second working state comprises at least one of following:
 the controller controls the first bridge, the second bridge, the third bridge, and the fourth bridge to be in a second state st2 to implement:
  the first bridge is configured to perform power conversion on a direct current voltage that is input from the first port of the bridge, and output a converted direct current voltage from the second port of the bridge;
  the first resonant network is configured to perform power conversion on an input direct current voltage, and output a converted direct current voltage; and
  the second bridge is configured to rectify a direct current voltage that is input from the first port of the bridge, and output a rectified direct current voltage from the second port of the bridge; or
 the controller controls the first bridge, the second bridge, the third bridge, and the fourth bridge to be in a second state st2 to implement:
  the third bridge is configured to perform power conversion on a direct current voltage that is input from the first port of the bridge, and output a converted direct current voltage from the second port of the bridge;
  the second resonant network is configured to perform power conversion on an input direct current voltage, and output a converted direct current voltage; and
  the fourth bridge is configured to rectify a direct current voltage that is input from the first port of the bridge, and output a rectified direct current voltage from the second port of the bridge,
 wherein the second direct current voltage is the direct current voltage that is input from the first port of the first bridge, or the direct current voltage that is input from the first port of the third bridge, or a sum of the direct current voltage that is input from the first port of the first bridge and the direct current voltage that is input from the first port of the third bridge; and
 wherein the first direct current voltage is the direct current voltage that is output from the second port of the second bridge, or the direct current voltage that is output from the second port of the fourth bridge, or a sum of the direct current voltage that is output from the second port of the second bridge and the direct current voltage that is output from the second port of the fourth bridge.

12. The bidirectional energy transmission apparatus according to claim 6, wherein the controller controlling the DC-DC circuit to be in the fourth working state comprises at least one of the following:
 the controller controls the first bridge, the second bridge, the third bridge, and the fourth bridge to be in a fourth state st4 to implement:
  the second bridge is configured to perform power conversion on a direct current voltage that is input from the second port of the bridge, and output a converted direct current voltage from the first port of the bridge;
  the first resonant network is configured to perform power conversion on an input direct current voltage, and output a converted direct current voltage; and
  the first bridge is configured to rectify a direct current voltage that is input from the second port of the bridge, and output a rectified direct current voltage from the first port of the bridge; or
 the controller controls the first bridge, the second bridge, the third bridge, and the fourth bridge to be in a fourth state st4 to implement:
  the fourth bridge is configured to perform power conversion on a direct current voltage that is input from the second port of the bridge, and output a converted direct current voltage from the first port of the bridge;
  the second resonant network is configured to perform power conversion on an input direct current voltage, and output a converted direct current voltage; and
  the third bridge is configured to rectify a direct current voltage that is input from the second port of the bridge, and output a rectified direct current voltage from the first port of the bridge,
 wherein the second direct current voltage is the direct current voltage that is output from the first port of the first bridge, or the direct current voltage that is output from the first port of the third bridge, or a sum of the direct current voltage that is output from the first port of the first bridge and the direct current voltage that is output from the first port of the third bridge; and
 wherein the first direct current voltage is the direct current voltage that is input from the second port of the second bridge, or the direct current voltage that is input from the second port of the fourth bridge, or a sum of the direct current voltage that is input from the second port of the second bridge and the direct current voltage that is input from the second port of the fourth bridge.

13. The bidirectional energy transmission apparatus according to claim 6, wherein:
the first port of the bidirectional energy transmission circuit comprises an A-phase port, a B-phase port, a C-phase port, and an N-phase port;
when the three-phase alternating current voltage is input or output from the first port of the bidirectional energy transmission circuit, the three-phase alternating current voltage is input or output from the A-phase port, the B-phase port, the C-phase port, and the N-phase port of the bidirectional energy transmission circuit; or
when the single-phase alternating current voltage is input or output from the first port of the bidirectional energy transmission circuit, the single-phase alternating current voltage is input or output from the A-phase port and the N-phase port of the bidirectional energy transmission circuit.

14. The bidirectional energy transmission apparatus according to claim 13, wherein:
the energy storage/filter circuit comprises a capacitor C1, a capacitor C2, a capacitor C3, an inductor L1, an inductor L2, an inductor L3, a switching transistor S1, and a switching transistor S2;
a first end part of the inductor L1 is connected to a first end part of the switching transistor S2 by using the capacitor C1;
a first end part of the inductor L2 is connected to the first end part of the switching transistor S2 by using the capacitor C2 and the switching transistor S1 that are connected in parallel;
a first end part of the inductor L3 is connected to the first end part of the switching transistor S2 by using the capacitor C3;
the first end part of the inductor L1, the first end part of the inductor L2, and the first end part of the inductor L3 are respectively the A-phase port, the B-phase port, and the C-phase port;
the first end part of the switching transistor S2 is the N-phase port;
a second end part of the inductor L1, a second end part of the inductor L2, and a second end part of the inductor L3 form the second port of the energy storage/filter circuit;
a second end part of the switching transistor S2 is the third port of the energy storage/filter circuit; and
the controlled terminal of the energy storage/filter circuit comprises a controlled terminal of the switching transistor S1 and a controlled terminal of the switching transistor S2.

15. The bidirectional energy transmission apparatus according to claim 14, wherein:
the switching network comprises a MOS transistor Q1, a MOS transistor Q2, a MOS transistor Q3, a MOS transistor Q4, a MOS transistor Q5, a MOS transistor Q6, a switching transistor S3, a switching transistor S4, and a switching transistor S5;
both a drain of the MOS transistor Q1 and a drain of the MOS transistor Q3 are connected to a drain of the MOS transistor Q5;
a source of the MOS transistor Q1 is connected to a drain of the MOS transistor Q2;
a source of the MOS transistor Q2 is connected to a drain of the MOS transistor Q4;

a source of the MOS transistor Q5 is connected to a drain of the MOS transistor Q6;
both the source of the MOS transistor Q2 and a source of the MOS transistor Q4 are connected to a source of the MOS transistor Q6;
a first end part of the switching transistor S3 is connected between the source of the MOS transistor Q1 and the drain of the MOS transistor Q2;
a first end part of the switching transistor S4 is connected between a source of the MOS transistor Q3 and the drain of the MOS transistor Q4;
a first end part of the switching transistor S5 is connected between the source of the MOS transistor Q5 and the drain of the MOS transistor Q6;
the source of the MOS transistor Q1, the source of the MOS transistor Q3, and the source of the MOS transistor Q5 form the first port of the switching network;
the drain of the MOS transistor Q5, the source of the MOS transistor Q6, a second end part of the switching transistor S3, a second end part of the switching transistor S4, and a second end part of the switching transistor S5 form the second port of the switching network; and
the controlled terminal of the switching network comprises a gate of the MOS transistor Q1, a gate of the MOS transistor Q2, a gate of the MOS transistor Q3, a gate of the MOS transistor Q4, a gate of the MOS transistor Q5, a gate of the MOS transistor Q6, a controlled terminal of the switching transistor S3, a controlled terminal of the switching transistor S4, and a controlled terminal of the switching transistor S5.

16. The bidirectional energy transmission apparatus according to claim 15, wherein:
the energy storage circuit comprises a capacitor C9 and a capacitor C10, and a second end part of the capacitor C9 is connected to a first end part of the capacitor C10;
the second port of the energy storage/filter circuit is connected to the first port of the switching network comprises:
the second end part of the inductor L1 is connected between the source of the MOS transistor Q1 and the drain of the MOS transistor Q2;
the second end part of the inductor L2 is connected between the source of the MOS transistor Q3 and the drain of the MOS transistor Q4; and
the second end part of the inductor L3 is connected between the source of the MOS transistor Q5 and the drain of the MOS transistor Q6;
the second port of the switching network is connected to the first port of the energy storage circuit comprises:
the drain of the MOS transistor Q5 is connected to a first end part of the capacitor C9;
the source of the MOS transistor Q6 is connected to a second end part of the capacitor C10;
the second end part of the switching transistor S3;
the second end part of the switching transistor S4; and
the second end part of the switching transistor S5 are all connected between the first end part of the capacitor C9 and the second end part of the capacitor C10; and
the third port of the energy storage/filter circuit is connected to the first port of the energy storage circuit specifically comprises: the second end part of the switching transistor S2 is connected between the second end part of the capacitor C9 and the first end part of the capacitor C10.

17. The bidirectional energy transmission apparatus according to claim 16, wherein:
- each of the first bridge, the second bridge, the third bridge, and the fourth bridge comprises a first MOS transistor, a second MOS transistor, a third MOS transistor, and a fourth MOS transistor;
- for each bridge, a drain of the third MOS transistor is connected to a drain of the first MOS transistor, a source of the first MOS transistor is connected to a drain of the second MOS transistor, a source of the third MOS transistor is connected to the drain of the second MOS transistor, and a source of the fourth MOS transistor is connected to a source of the second MOS transistor;
- each of the first resonant network and the second resonant network comprises a first capacitor, a first inductor, a transformer, a second inductor, and a second capacitor;
- for each resonant network, a second end part of the first capacitor is connected to a dotted terminal of a primary coil of the transformer by using the first inductor, and a dotted terminal of a secondary coil of the transformer is connected to a first end part of the second capacitor by using the second inductor; and
- the controlled terminal of each of the first bridge, the second bridge, the third bridge, and the fourth bridge comprises a gate of the first MOS transistor, a gate of the second MOS transistor, a gate of the third MOS transistor, and a gate of the fourth MOS transistor.

18. The bidirectional energy transmission apparatus according to claim 17, wherein:
- the second port of the first bridge is connected to the first port of the first resonant network comprises:
  - a first end part of the first capacitor of the first resonant network is connected between the source of the third MOS transistor and the drain of the fourth MOS transistor in the first bridge; and
  - an undotted terminal of the primary coil of the transformer of the first resonant network is connected between the source of the first MOS transistor and the drain of the second MOS transistor in the first bridge;
- the second port of the first resonant network is connected to the first port of the second bridge comprises:
  - a second end part of the second capacitor of the first resonant network is connected between the source of the first MOS transistor and the drain of the second MOS transistor in the second bridge; and
  - an undotted terminal of the secondary coil of the transformer of the first resonant network is connected between the source of the third MOS transistor and the drain of the fourth MOS transistor in the second bridge;
- the second port of the third bridge is connected to the first port of the second resonant network comprises:
  - a first end part of the first capacitor of the second resonant network is connected between the source of the third MOS transistor and the drain of the fourth MOS transistor in the third bridge; and
  - an undotted terminal of the primary coil of the transformer of the second resonant network is connected between the source of the first MOS transistor and the drain of the second MOS transistor in the third bridge; and
- the second port of the second resonant network is connected to the first port of the fourth bridge comprises:
  - a second end part of the second capacitor of the second resonant network is connected between the source of the first MOS transistor and the drain of the second MOS transistor in the fourth bridge; and
  - an undotted terminal of the secondary coil of the transformer of the second resonant network is connected between the source of the third MOS transistor and the drain of the fourth MOS transistor in the fourth bridge.

19. The bidirectional energy transmission apparatus according to claim 18, wherein the second port of the bidirectional conversion circuit is connected to the first port of the DC-DC circuit comprises:
- the drain of the first MOS transistor in the first bridge is connected to the first end part of the capacitor C9;
- both the source of the second MOS transistor in the first bridge and the drain of the first MOS transistor in the third bridge are connected between the second end part of the capacitor C9 and the first end part of the capacitor C10; and
- the source of the second MOS transistor in the second bridge is connected to the second end part of the capacitor C10.

20. The bidirectional energy transmission apparatus according to claim 19, wherein the controller controlling the energy storage/filter circuit and the switching network to be in the first state st1 comprises:
- the controller controls the switching transistor S1 and the switching transistor S2 in the energy storage/filter circuit and the MOS transistor Q1, the MOS transistor Q2, the MOS transistor Q3, the MOS transistor Q4, the MOS transistor Q5, the MOS transistor Q6, the switching transistor S3, the switching transistor S4, and the switching transistor S5 in the switching network to be separately turned off and on according to a corresponding first preset rule to implement:
  - the energy storage/filter circuit performs energy storage on the three-phase alternating current voltage that is input from the first port of the energy storage/filter circuit, and outputs the direct current voltage from the second port of the energy storage/filter circuit;
  - the switching network performs power conversion on a direct current voltage that is input from the first port of the switching network, and outputs a converted direct current voltage from the second port of the switching network; and
  - the energy storage network performs energy storage on a direct current voltage that is input from the first port of the energy storage network, and outputs the second direct current voltage from the second port of the energy storage circuit.

* * * * *